United States Patent [19]
Chang et al.

[11] Patent Number: 5,258,422
[45] Date of Patent: Nov. 2, 1993

[54] COMPOSTABLE THERMOPLASTIC COMPOSITIONS

[75] Inventors: Peter I. Chang; Carl D. Ray; Alvin W. Gross, all of Terre Haute, Ind.

[73] Assignee: Tredegar Industries, Inc., Richmond, Va.

[21] Appl. No.: 878,738

[22] Filed: May 5, 1992

[51] Int. Cl.⁵ .................................................. C08K 3/00
[52] U.S. Cl. .................................... 523/124; 523/125; 523/126; 523/128; 524/126; 524/128; 524/394
[58] Field of Search ............... 523/124, 125, 126, 128; 524/126, 128, 394

[56] References Cited

U.S. PATENT DOCUMENTS

| | | | |
|---|---|---|---|
| 3,361,690 | 1/1968 | Gregory et al. | 260/17.4 |
| 3,454,510 | 7/1969 | Newland et al. | 260/23 |
| 3,468,724 | 9/1969 | Reinbold | 148/16.5 |
| 3,590,528 | 7/1971 | Shephard | 47/9 |
| 3,592,792 | 7/1971 | Newland et al. | 260/41 |
| 3,634,562 | 1/1972 | Kole et al. | 264/41 |
| 3,676,401 | 7/1972 | Henry | 260/63 CQ |
| 3,707,056 | 12/1972 | Cole et al. | 47/9 |
| 3,767,604 | 10/1973 | Hjermstad et al. | 260/17.4 |
| 3,797,690 | 3/1974 | Taylor et al. | 220/1 R |
| 3,825,626 | 7/1974 | McGaugh | 260/897 A |
| 3,840,512 | 10/1974 | Brackman | 523/126 |
| 3,847,852 | 11/1974 | White et al. | 260/23 H |
| 3,856,747 | 12/1974 | Dibiasi | 260/45.7 P |
| 3,865,767 | 2/1975 | Boberg | 260/23 H |
| 3,867,324 | 2/1975 | Clendinning et al. | 260/23 H |
| 3,869,324 | 3/1975 | Basi et al. | 156/17 |
| 3,882,058 | 5/1975 | LeBrasseur et al. | 260/23 H |
| 3,886,683 | 6/1975 | Hudgin et al. | 47/9 |
| 3,888,804 | 6/1975 | Swanholm et al. | 260/2.5 HB |
| 3,896,585 | 7/1975 | Miller et al. | 47/9 |
| 3,901,838 | 8/1975 | Clendinning et al. | 260/23 H |
| 3,935,141 | 1/1976 | Potts et al. | 260/23 H |
| 3,949,145 | 4/1976 | Otey et al. | 428/423 |
| 3,952,347 | 4/1976 | Comerford et al. | 5/335 |
| 4,016,117 | 4/1977 | Griffin | 260/17.4 |
| 4,021,388 | 5/1977 | Griffin | 260/13 |
| 4,026,849 | 5/1977 | Bagley et al. | 260/17.4 GC |
| 4,038,227 | 7/1977 | Swanholm et al. | 260/23 H |
| 4,067,836 | 1/1978 | Potts et al. | 260/23 H |
| 4,082,903 | 4/1978 | Chow | 428/514 |
| 4,125,495 | 11/1978 | Griffin | 260/17.4 ST |
| 4,218,350 | 8/1980 | Griffin | 260/17.4 ST |
| 4,420,576 | 12/1983 | Griffin | 524/47 |
| 4,461,853 | 7/1984 | Gilead et al. | 523/126 |
| 4,519,161 | 5/1985 | Gilead et al. | 47/9 |
| 4,931,488 | 6/1990 | Chiquet | 523/126 |
| 4,983,651 | 1/1991 | Griffin | 524/47 |
| 4,985,024 | 1/1991 | Sipinen | 604/389 |

FOREIGN PATENT DOCUMENTS

| | | |
|---|---|---|
| 0408503A2 | 5/1990 | European Pat. Off. . |
| 8809354 | 12/1988 | PCT Int'l Appl. ............ 523/124 |
| 1485833 | 9/1974 | United Kingdom . |
| 1529221 | 10/1978 | United Kingdom . |

OTHER PUBLICATIONS

King, "A Technical Study of Municipal Solid Waste Composting and the Effect of Disposable Paper Diapers", Procter & Gamble, Cincinnati, OH, Sep. 1991.
*Solid Waste Composting Council*, brochure, Washington, D.C., Nov. 1990.
Laermer, "Alpha-Tocopherol (Vitamin E) The Natural Antioxidant for Polyolefins", Roche, Presented at Enviroplas '90, First International Conference on Reformulating Plastics For A Cleaner Environment, Chicago, IL, Sep. 12-13, pp. 1-21, 1990.
Roscoe et al., "Stabilization of Polyolefin Packaging Materials With Organophosphite Stabilizers", pp. 117-120, *Tappi Journal*, Sep. 1990.

(List continued on next page.)

*Primary Examiner*—Paul R. Michl
*Assistant Examiner*—LaVonda DeWitt

[57] ABSTRACT

The present invention relates to compostable and biodegradable thermoplastic compositions comprising a thermoplastic polymer, a hydrolytically unstable antioxidant, a pro-oxidant, an accelerator, and a property modifier. The hydrolytically unstable antioxidants effectively prevent the thermoplastic polymer from breakdown by oxidative or thermal degradation under dry conditions. Under wet conditions, the hydrolytically unstable antioxidant becomes ineffective and the thermoplastic polymers breakdown to low molecular weight materials.

24 Claims, 3 Drawing Sheets

OTHER PUBLICATIONS

Ryan, "Investigating the Degradability of Hot Melt Adhesive Formulae", pp. 302–334, *Adhesive Age*, Jul. 1990.

Scott, "Photo-biodegradable Plastics: Their Role in the Protection of the Environment", pp. 135–144, *Polymer Degradation and Stability*, 29, 1990, England.

Woutat, "Diapers to Dirt", *Minneapolis Star Tribune*, pp. 1, 6A, 8A, Nov. 19, 1989.

"P&G Speaks On Disposability", p. 46, *Nonwovens Industry*, Nov. 1989.

Laermer et al., "Use of Biological Antioxidants and Their Derivatives as Polypropylene Stabilizers", Presented at the PRI International Polypropylene Conference, Madrid, Spain, pp. 1–15, Nov. 1989.

"New additive offers 'timed' breakdown", *PlasticsWorld*, Aug. 1987, A Cahners Publication.

Griffin, "Degradable Plastic Films", pp. 47–50, Proceedings of Symposium on Degradable Plastics, The Society of the Plastics Industry, Inc., Washington, D.C., Jun. 10, 1987.

Johnson et al., "Polyolefin Processing Aid Versus Additive Package?", pp. 43–46, *Plastics Engineering*, Jul. 1988.

Gilead, et al., "A New, Time-Controlled, Photodegradable Plastic", pp. 37–38, Proceedings of Symposium on Degradable Plastics, The Society of the Plastics Industry, Inc., Washington, D.C., Jun. 10, 1987.

Brilliant, "Heat Stabilizers", pp. 154–159, *Modern Plastics Encyclopedia*, 1986–1987.

Klemchuk et al., "Long-Term Aging Study of Antioxidants in Polyolefins", pp. 42–46, *Plastics Compounding*, Sep./Oct. 1985.

Sipinen et al., "A Study of the Oxidative Degradation of Polyolefins", pp. 185–187., *Polymeric Materials Science and Engineering*, vol. 67, Fall Mtg., 1992, Washington, D.C.

Vanderbilt et al., "Degradability Testing of (Low Density Polyethylene (LDPE) Starch) and (Ethylene Carbon Monoxide Copolymer (ECO)/Starch/Corn Oil Blends)", pp. 277–291, *Book of Papers, INDA-TEC 92, The International Nonwovens Technical Conference*, Apr. 7–10, 1992, Bonaventure Resort & Spa, Ft. Lauderdale, FL.

Schut, "Syndiotactic PP Is Now for Real", pp. 29 and 31, *Plastics Technology*, Mar. 1992.

Turner, "MSW Composting, 1990s-Style", pp. 18–25, *Solid Waste & Power*, Jan./Feb. 1992.

Lindsay, "'Truly degradable' resins are now truly commercial", pp. 62–64, *Modern Plastics*, Feb. 1992.

Miller, "Polypropylene", pp. 79–80, *Modern Plastics*, Resins and Compounds, Mid-October 1992.

Blair, "PP homopolymer", pp. 80 and 82, *Modern Plastics*, Resins and Compounds, Mid-October 1991.

Vernon, "PP impact copolymers", pp. 82 and 84, *Modern Plastics*, Resins and Compounds, Mid-October 1991.

Walsh, "PP random copolymers", pp. 84–85, *Modern Plastics*, Resins and Compounds, Mid-October 1991.

Gilead, "Plastics That Self Destruct", Reprinted from Chemtech, 1985, vol. 15, pp. 299–301.

*Encyclopedia of Chemical Technology*, Supplement Volume, John Wiley & Sons, Inc., New York, 1984, pp. 652, 667.

Paolino, "Antioxidants: Inhibiting Polymer Degradation", Uniroyal Chemicals Div., Uniroyal Inc., Naugatuck, Conn., *Plastics Compounding*, Sep./Oct. 1980.

Bair, "Exudation of an Antioxidant Additive From Thin Polyethylene Films", Soc. Plast. Eng. (Tech. Pap) 31st Annual Technical Conf. p. 106, Bell Laboratories, Murray Hill, New Jersey.

Seymour, *Additives For Plastics*, vol. 1, State of the Art, pp. 251–254, Academic Press, New York, 1978, A Subsidiary of Harcourt Brace Jovanovich, Publishers.

Seymour, *Additives For Plastics*, vol. 2, New Developments, pp. 108–111, Academic Press, New York, San Francisco, London, 1978, A subsidiary of Harcourt Brace Jovanovich, Publishers.

Swasey, "Improving Polyolefin Processing Stability With a Phosphonite Stabilizer", pp. 136–138, *Modern Plastics*, Nov. 1976.

Cowell, "Additives for Plastics-Antioxidants", *Plastics Engineering*, pp. 51–57, Oct. 1976.

Abramofi, "Antioxidants", *Modern Plastics Encyclopedia, pp. 144–145, 1977–1978.*

Kläui, "Tocopherol, Carotene and Ascorbyl Palmitate", *Flayours*, pp. 1–8, Jul./Aug. 1976.

Carlson et al., "Degradable Concentrates for Polyolefins", Proceedings of Symposium on Degradable Plastics, pp. 26–30, The Society of the Plastics Industry, Inc., Washington, D.C, Jul. 10, 1967.

Cort, "Antioxidant Activity of Tocopherols, Ascorbyl Palmitate, and Ascorbic Acid and Their Mode of Action", p. 321, Reprinted from the Journal of the American Oil Chemists" Society, vol. 51, pp. 321–325, 1974.

"An Introduction to Free Radicals", Vitamin Nutrition Information Service, *Back-Grounder*, vol. 1, No. 2, pp. 1–4.

Glass et al., "The Influence of Additives on the Wetting Behavior of Polypropylene", pp. 31–36, Ethyl Corporation, Ethyl Technical Center, Baton Rouge, LA.

Tüdos, "Oxidation of Polyolefins", pp. 86–98, 1986, Central Research Institute for Chemistry of the Hungarian Academy of Sciences, Hungary.

Wishman, "Stabilization of Polypropylene Fibers", pp. 99–106, 1986, Phillips Fibers Corp., Greenville, SC.

Johnston, "Degradation and Stabilization of Linear Low Density Polyethylene During Melt Processing", pp. 169–181, 1986, Dow Chemical Co., Freeport, TX.

Hoffmann, "Rubber Technology Handbook", Hanser Publishers, Oxford Universit Press, New York, § 4.2.3–4.2.4.

Polythene-Chemical Properties, pp. 196–209.

An Infrared Spectroscopy Atlas for the Coatings Industry, pp. 41–48, 90, Federation of Societies for Coatings Technology, Philadelphia, PA.

Grassie, "The Practical Significance of Polymer Degradation", *Polymer Degradation and Stabilization*, pp. 1–16.

*Ecostar Update, Bio-degradable Plastics to Protect the Environment, St. Lawrence Starch Company Limited, Technical Bulletin, Ontario, Canada.*

"Albis Ecostar Masterbatch Pe-Starch MB 70/43/6", Albis Canada Inc., Albis Corporation, St. Lawrence Starch Company Limited, pp. 1–5, Technical Bulletin.

"LitterLess", U. V. Activated Biodegradable Plastic, pp. 1–4, Plastigone, Miami, FL, 1988, Technical Bulletin.

"Material Safety Data Sheet", LitterLess, U. V. Activated Biodegradable Plastic, pp. 1–3, Jun. 1, 1988, Miami, FL.

"Stabilizers", pp. 586–589, *Modern Plastics Encyclopedia*, Mid-October.

"Morthane ® Thermoplastic Polyurethanes For Extrusion", pp. 1–6, Morton International, Seabrook, NH, Technical Bulletin.

"Pellethane ® Polyurethane Elastomers", pp. 1–8, Dow Chemical Co., Midland, MI, Technical Bulletin.

"Estane ® Polyurethane Resin Selection Guide", pp. 1–4, BF. Goodrich, Cleveland, OH, 1989, Technical Bulletin.

TONE ® Polymers, Biodegradable Plastic Resins, pp. 1–17, Union Carbide, Danbury, CT, 1990, Technical Bulletin.

"UCAR Coatings Resins", Union Carbide, Danbury, CT, pp. 7–12, 1990, Technical Bulletin.

*Modern Plastics Encyclopedia '92*, Mid–October 1991, pp. 484–495, 509–515, 518–548.

Carbonax ®, p. 4, Technical Bulletin.

"Antioxidants for Polyolefins", CIBA–GEIGY, Nov., 1987, pp. 1, 3–4, 6–9, 11–16, 30–35, Technical Bulletin.

"Kraton ® Thermoplastic Rubber", Typical Properties, pp. 1–8, Shell Chemical Company, Technical Bulletin, 1988.

Stretanski, "Cyanamid Plastics Additives", American Cyanamid, Bridgewater, NJ, p. 1–21, Technical Bulletin.

"Development Phosphite X–398", Ethanox ® Antioxidant, Technical Bulletin, pp. 1–8, Ethyl Corporation, Baton Rouge, LA.

Naugard ® BHT, Uniroyal Chemical Co. Inc., Middlebury, CT, 1988, pp. 1–4, MSDS pp. 1–8, Technical Bulletin.

Sandostab ® P-EPQ, Sandoz, NJ, Technical Bulletin, pp. 3–4, 7.

"GE Specialty Chemicals", Weston ® and ®Ultranox Phosphites, Product Guide CA–4001F, pp. 2–24, Technical Bulletin.

Ethanox ® 398 Antioxidant, Ethyl Corporation, Baton Rouge, LA, pp. 1–4, Technical Bulletin.

Ampacet's Answer to Plastics Degradability, pp. 1–4, and, Poly-Grade, Poly-Grade II, Poly-Grade III, product information code 30091 (Jan. 1987), 31056 (May 1988), 20835 (Aug. 1988), 20837 (Aug. 1988), 21093 (Aug. 1988), pp. 1–7.

"Topanol ® CA", ICI Specialty Chemicals, pp. 1–2, Product Information Bulletin, Sep. 1985.

"Topanol ® CA", ICI Americas Inc., pp. 1–3, Technical Bulletin, 1987.

"Topanol ® CA", ICI Americas Inc., pp. 1–4, Technical Bulletin, 1983.

"Vitamin E USP, FCC", Product Data, Foods & Pharmaceuticals, pp. 1–4, Hoffman-LaRoche, NJ, Apr. 1989.

"Physical Properties of L-Ascorbic Acid".

"Ronotec 200" and "Ronotec 100", pp. 1–3, Hoffman-LaRoche, NJ, 1988.

"Ascorbic Acid USP,FCC", Product Data Foods & Pharmaceuticals, pp. 1–4, Hoffman-LaRoche, NJ, Aug. 1983.

COMPOSTABLE THERMOPLASTIC COMPOSITIONS

DESCRIPTION

1. Field of the Invention

The present invention relates to plastic compositions and films which are compostable.

2. Background of the Invention

According to a U.S. Environmental Protection Agency (EPA) study, of the 150 million-plus tons of total consumer discarded materials per year for 1986 about 17.9% is yard waste, 37.1% is paper and paperboard, and 8.1% is food waste. These materials can be composted. In addition, about 18 billion disposable (single-use) diapers per year are buried in landfills. Most of the materials in a conventional disposable absorbent product are compostable. A typical disposable diaper, for example, consists of about 80% compostable materials, e.g., wood pulp fibers, and the like.

Yard waste such as grass cuttings and leaves account for a large percent of municipal solid waste during the summer and fall seasons. Yard waste collection methods typically fall into two categories: containerized collection (in containers, or in starch-filled plastic bags or in double-layer, heavy-duty wet-strength paper bags) and loose collection (by vacuum trucks). The plastic bags and even the wet-strength paper bags do not break-up to expose the yard wastes to moisture. To remove the non-compostable plastic bags and some paper bags, debagging is normally done by hand, or by a turner which is modified to add knifes, or by a shredder. The small plastic films are then removed with a trommel. Recent regulatory initiatives establishing recycling goals and banning yard waste disposal in landfills, coupled with concerns about the worsening landfill situation, have contributed to a surge in the development of yard waste composting programs. Yard waste composting typically employs a low technology, windrow process which has minimal mechanical processing and a low level of control of the biological process. "Composting" can be a viable and economical means of processing municipal solid waste into useable soil amendment products, as well as a means of diverting waste from landfill disposal Composting is defined as the process of encouraging the biological decomposition of wastes high in organic content such as municipal solid waste, yard waste, or organic residuals from a resource recovery facility. The decomposed matter is called "compost" and is used as a soil additive to increase soil aeration and moisture.

The term "compostable" generally means that (1) a material is capable of being processed in a composting facility for solid waste; (2) if so processed the material will end up in the final compost; and, (3) if the compost is used in the soil the material will ultimately biodegrade in the soil. A compostable material should be fully biodegraded to carbon dioxide and water. Biodegradation is a very slow process and may take several months or even years to complete. The length of time the compostable material takes to fully biodegrade is not important as long as the compostable material itself and the intermediary decomposition products are not toxic or otherwise harmful to the soil or the crops and the man-made materials do not accumulate in the soil.

Municipal solid waste can be composted alone or co-composted with sewage sludge in large scale composting facilities that employ high levels of preprocessing and active compost process control. The major composting technologies are in-vessel, turning windrow (aerated windrow), static pile (forced aeration windrow), and open-top bunker.

The main factors involved in the municipal solid waste and yard waste composting processes include aeration, moisture, temperature, mechanical actions, and the presence of micro-organisms. We have found that a combination of these factors can be fully utilized in the decomposition of the compostable compositions of the present invention.

Aeration (oxygen supply), moisture and temperature are major factors which affect the composting processes. In a normal composting process, the temperatures within a composter or in a windrow change as different types of microorganisms become active. Initially, at ambient temperature, mesophilic organisms begin the breakdown of the waste materials, and their activity increases the temperature of the degrading waste materials. Above about 43° C. (110° F.) thermophilic organisms become active, and the rate of composting activity increases. As the composting is completed, or if the available air and moisture are consumed, the temperature returns to the mesophilic range. To complete composting as quickly as possible, it is desirable to maintain the internal temperature of the composter and composting pile in the thermophilic range, i.e. about 43° to about 71° C. (110° to 160° F.), until breakdown of the waste materials is nearly completed. Frequent aerating and adding moisture can help to maintain the composting pile in the thermophilic range.

The active composting stage is the primary phase of biological activity in the composting process. This phase has the greatest effect on reducing the weight and volume of the organic waste material, though proper conditions must be maintained to achieve high rates of decomposition, to minimize odors, and kill pathogens and weed seeds. The most efficient conditions for composting are achieved in "controlled dynamic systems" that are active in creating the optimum temperature, moisture, and aeration conditions. Controlled dynamic systems are characterized by a high level of process control and usually employ extensive feedstock preparation. These systems typically combine mechanical turning equipment, forced aeration systems, and water sprayers.

BACKGROUND ART

There are numerous types of films and materials which are generally being described as "degradable". These materials include polymers which are photodegradable, chemically degradable, biodegradable or semi-biodegradable like some starch-additive-and-polymer formulations.

While conventional polyethylene backsheets and the starch-filled polyethylene backsheets may be broken down into small pieces by mechanical means (i.e., by shredding or mechanical actions inside the rotating composter), they are not compostable. The conventional polyethylene backsheets and the starch-filled polyethylene backsheets are not biodegradable. Biodegradation (or biodecomposition) of the starch-filled plastic films by microorganisms is a very slow process. Microorganisms can only attack the starch granules on the very top surface of a starch-filled plastic film. The remaindering plastic film is not biodegradable.

Commercial starch-filled plastic films contain about 6 to 10% by weight of starch, a pro-oxidant (or pro-degradant) and an accelerator. The pro-oxidant is an oxidation catalyst, which aids in the thermal or photodegradation of the film. Suitable pro-oxidants include transition metal salts including, for example, manganese stearate or a blend of manganese stearate (thermal) and iron stearate (photo). The accelerators typically include an unstable, unsaturated 1,4-diene rubber and a biodegradable filler such as starch. The base resin of the starch-filled films is a stable, non-biodegradable resin such as polyethylene, polypropylene or polystyrene.

For example, the Griffin U.S. Pat. No. 4,983,651 and PCT WO88/09354 relate to a starch-based antioxidant/pro-oxidant resin blend. The presence of the antioxidant and the pro-oxidant give an "induction period" before a sharp loss in physical strength of the resin occurs. The starch-filled plastic films contain a phenolic-type antioxidant such as 4-methyl-1,6-di(2-hydroxy-3-tertbutyl-5-methylbenzyl) phenol which is normally used for stabilizing most low density polyethylene materials. The total amount of antioxidant in the starch-filled polyolefin resin blends is the amount presented in the polyolefin base resin plus the amount in the carrier resins of the additives and also in the unsaturated rubber. No additional antioxidant is added to the starch-filled resin blends. The amount of antioxidant in the resin blend is partially consumed during the film extrusion processes and the remainder is gradually consumed during aging. The remaining antioxidant is used to maintain a "shelf-life" (i.e., an induction period). However, this antioxidant/pro-oxidant system does not have well controlled shelf-life or rate of degradation.

The Gilead et al., U.S. Pat. Nos. 4,519,161 and 4,461,853 disclose "time-controlled" photodegradable mulch films which contain a mixture of a photoactivator and a photostabilizer (antioxidant). The photoactivator is an iron, manganese, or cerium complex. The photostabilizer (or ultraviolet light stabilizer) is a nonionic organosoluble antioxidant such as a nickel or cobalt complex. These transition metal complexes can be selected from the group consisting of a dithiocarbamate, dithiophosphate, xanthate, cyclic phosphate, oxime, benzthiazole and benimidazole. The metal (iron, nickel or cobalt) complexes are derived from an alkyl-dithiocarbamate such as dibutyldithiocarbamates. The Gilead et al. '161 and '853 disclose the use of conventional thermal antioxidants/stabilizers such as 1,1,2-tris-4-(2-tert-butyl-4-hydroxy-5-methyl)-phenylpropane and BHT (butylated hydroxy toluene or di-tert-butyl-p-cresol). As described in the Gilead et al. '161 and '853 patents, the optional antioxidant is used to provide additional stability during film or fiber forming operation but the antioxidant itself plays no part in determining the embrittlement time.

In the Gilead et al. '161 and '853 patents, the nickel dibutyldithiocabamate (NBC or NDBC) UV light stabilizer functions both by decomposing hydroperoxides and by being a strong UV absorber (or photostabilizer). The photo-stabilizer provides a "controllable induction period" during which the properties of the polymer do not change. The controllable induction period is followed by rapid deterioration of mechanical properties due to "photo-oxidation" triggered by the photoactivator after exposed to UV light. The length of the induction period can be controlled by the relative concentration of two metal complexes (i.e., nickel and iron complexes). However, the UV light source (i.e., the sunlight) is not controllable. The amount of UV light received by the plastic mulch film can be affected by a combination of factors such as seasons, geographical locations, weather conditions, type of crop, etc. Therefore, the induction period is not controllable.

These "starch-based antioxidant/pro-oxidant" polymers and the "antioxidant/photoactivator" polymers can not be used to produce compostable films suitable for diaper backsheets and yard waste bags. The plastic films used in diaper backsheets and yard waste bags do not receive UV radiation to cause the film to breakdown into fragments small enough to pass an initial screening in a composter or windrow and the molecular weights of the polyolefin resins do not decrease enough (i.e., under 1,000) to be biodegradable. Non-biodegradable, "plastic dust" is not desirable in the final compost product.

There is a need for reducing the amount of non-compostable materials in disposable articles. There is a further need to produce compostable films suitable for such uses as backsheets in absorbent articles and yard waste bag. There is a particular need to replace the non-compostable backsheet in absorbent articles with liquid impervious films comprised of compostable materials.

It is an object of the present invention to provide polymer compositions useful for compostable films. The compostable compositions provided by this invention have excellent "long-term shelf-life" under "dry" conditions during melt processing, product storage and end use periods, and can be disintegrated quickly under the "wet" composting conditions. According to the present invention, the molecular weights of the compostable polymer composition decrease continuously both during and after composting such that the compostable compositions can ultimately be biodegraded in the presence of micro-organisms.

Another object of the present invention is to provide compostable, liquid impervious thermoplastic films which are suitable for use as backsheets in absorbent articles such as diapers, sanitary napkins, pantiliners, and the like, which are adapted for absorbing various bodily fluids.

Another object of the present invention is to provide a compostable film which is suitable for use as film backings for diaper fastening tab, release tapes, and frontal target strip in many disposable products.

It is also an object of the present invention to provide a compostable film which is suitable for a variety of product applications such as plastic yard waste bags, plastic garbage bags, agricultural mulch film, heat-sealable packaging films, and other such disposable products.

SUMMARY OF THE INVENTION

The present invention relates to a compostable thermoplastic composition comprising at least one thermoplastic polymer, hydrolytically unstable antioxidant, pro-oxidant (or pro-degradant), accelerator, and property modifier. The compostable compositions can contain blends of each of the thermoplastic polymers, hydrolytically unstable antioxidants, pro-oxidants, accelerators, and property modifiers. In certain embodiments it is preferred that the thermoplastic polymer be "unstabilized"; that is, contain few or no anti-oxidants or other ingredients which are typically added to the thermoplastic polymer by the thermoplastic polymer manufacturer. Optionally, the compostable compositions can also include other components such as heat stabilizers, biodegradable polymers, biodegradable organic additives, inorganic additives, antiblocking agents, antistatic agents, slip agents, pigments, plasticizers and other desired components which do not affect the compostability of the thermoplastic composition of the present invention.

In one aspect, the present invention comprises the use of hydrolytically unstable antioxidants. Under the "dry" melt processing, product storage and end-use periods, the hydrolytically unstable antioxidants effectively protect the thermoplastic polymer from breakdown by oxidative/thermal degradation. Therefore, under "dry" conditions, the compostable films can have excellent "long-term shelf-life". Under the "wet" composting conditions (the combination of high moisture level, high aeration rate, elevated composting temperature, acidic pH level, and mechanical forces), the hydrolytically unstable antioxidant becomes ineffective and the thermoplastic polymers breakdown quickly by oxidative and thermal degration in the presence of pro-oxidants and/or accelerators. The degraded films become very fragile and can be disintegrated into fragments by the mechanical actions which occur during various composting processes. The molecular weights of the plastic fragments decrease quickly and continuously to very low molecular weight materials such that the compostable thermoplastic composition of the present invention can ultimately be biodegraded in the presence of microorganisms.

Thus, by varying the amount of hydrolytically unstable antioxidants, pro-oxidants, accelerators, and property modifiers in the composition of the present invention, the specific performance properties (including required shelf-life) and the desirable compostability of the compostable thermoplastic composition can be achieved.

BRIEF DESCRIPTION OF THE DRAWINGS

As seen in FIG. 2, the polyethylene film samples have no change in chemical structure. In comparison, as seen in FIG. 3, the compostable film samples of the present invention were broken-down by chain scission processes to low molecular materials after 10-day or 30-day composting.

BEST MODE OF CARRYING OUT INVENTION

Figure 1:
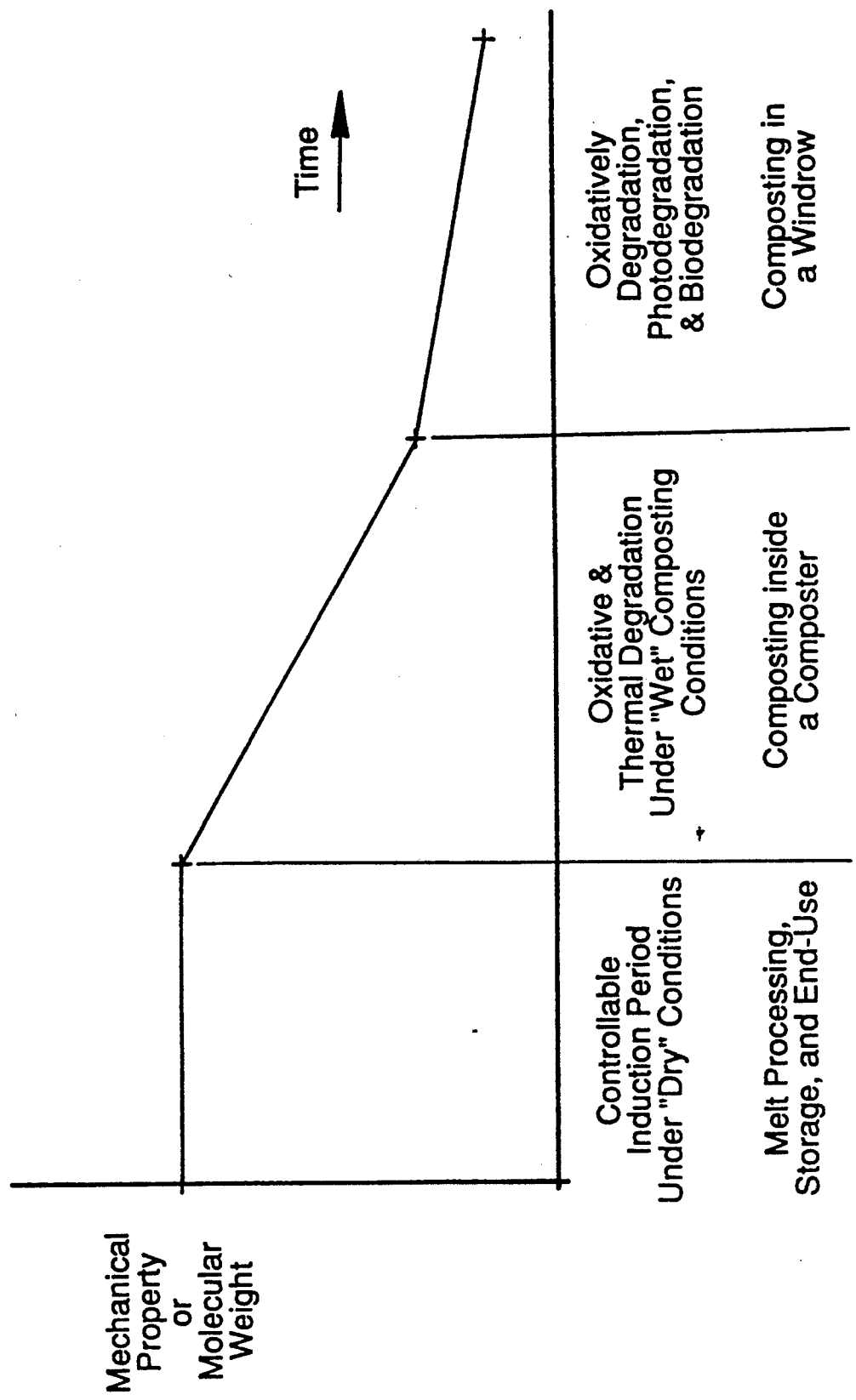
FIG. 1 is a graph showing mechanical property and molecular weight changes over a period of time, and illustrating the effect of oxidative/thermal degradation under wet composting conditions inside a composter and the effect of oxidative/degradation/photodegradation/biodegradation in a windrow on the compostable films embodying the present invention.

According to the present invention, the compostable thermoplastic composition comprises at least one thermoplastic polymer, hydrolytically unstable antioxidant, pro-oxidant, accelerator, and property modifier. Optional ingredients that also can be used in the compositions include heat stabilizers, biodegradable polymers, biodegradable organic additives, inorganic additives, antiblocking agents, antistatic agents, slip agents, pigments, plasticizers, and the like.

A. Thermoplastic Polymers

The thermoplastic polymers useful as base resins in the compostable compositions of the present invention generally comprise thermoplastic homopolymers, copolymers, and terpolymers of alphaolefins, such as polypropylene, polyethylene, polystyrene, and blends thereof. Other base polymers include copolymers of ethylenepropylene, copolymers of ethylene-carbon monoxide (ECO), and blends of these polymers.

In one embodiment of the present invention, homopolymer, copolymers, and terpolymers of polypropylene are preferred polymers since they are more easily oxidized than polyethylene. The presence of a tertiary carbon-hydrogen group along the chain increases the susceptibility of polypropylene to oxidation. The heat inputs (during melt processing and composting) can initiate a free radical chain reaction leading to polymer scission or crosslinking with consequent deterioration of physical properties. The polymer radicals also react with oxygen to form hydroperoxides that undergo disproportionation reactions resulting in polymer chain scission.

Also random or impact copolymers and terpolymers of polypropylene are also preferred polymers. Typical impact polypropylene copolymers are copolymers of propylene and ethylenepropylene rubber (EPR) and copolymers of butene (or hexene) and propylene. Typical impact polypropylene terpolymers are terpolymers of ethylene, butene (or hexene), and propylene. The impact polypropylene copolymer is normally produced from two reactors connected in series. The first reactor produces propylene and the second reactor products EPR. The impact polypropylene has better physical properties than a blend of polypropylene homopolymer and EPR.

Many commercial polypropylene copolymer resins contain low levels of ethylene (i.e., below 1.0% or up to 3.0% by weight of ethylene). To be used in the compositions of the present invention, the comonomer content (i.e., ethylene, butene or hexene content) in the polypropylene copolymers or terpolymers is preferably in the range of 3.0% to 20% by weight and more preferably in the range of 6.0% to 20% by weight.

Inserting a comonomer (i.e., ethylene, butene, or hexene) at intervals along the propylene chain (random copolymer) makes the propylene chain less regular and more flexible, which in turn reduces crystallinity, modulus, melting point, and the sharpness of melting point. Since the ethylene, the butene, or the hexene chains in copolymers or terpolymers of polypropylene are more susceptible to moisture than the propylene chains, high content of comonomer (i.e., ethylene, butene, or hexene) are often preferred. Under the "wet" composting conditions, the moisture and the organic acids can reach the hydrolytically unstable antioxidant quickly. The polypropylene copolymers or terpolymers with high comomer content have better impact and tear strengths than the polypropylene homopolymers or copolymers and terpolymers with low comomer content.

Ethylene-carbon monoxide copolymers and ethylene-vinyl ketone copolymers are also the preferred polymers. Carbon monoxide and vinyl ketone are photosensitive groups which can be incorporated into ethylene chains to enhance photodegradability. When exposed to sunlight, these copolymers undergo photodegradation, principally by the Norrish II mechanism. Photodegradation and embrittlement rates increase when the percentage of these photosensitive groups is increased in the base resin. The unstabilized copolymers of ethylene-carbon monoxide and ethylene-vinyl ketone are also thermally unstable. The compostable compositions made of these copolymers can undergo oxidative and thermal degradation when they are inside a rotating composter or windrow and can undergo photodegradation when exposed to sunlight.

Unstabilized versions of "the oxidatively/thermally unstable thermoplastic polymers" are also preferred polymers. An "unstabilized" thermoplastic resin or "stabilizer-free" thermoplastic resin is a thermoplastic resin or blend which contains either no or a very low level of an antioxidant and a heat-stabilizer.

B. Hydrolytically Unstable Antioxidants

Organic materials react with molecular oxygen in a process called "autoxidation" which is initiated by heat, light (high energy radiation), mechanical stress, catalyst residues, or reactions with impurities to form alkyl free radicals. The free radicals have a high affinity for reacting with oxygen to form unstable peroxy radicals. Thus, the polymers deteriorate through a complex sequence of chemical reactions which result in chain scission or cross-linking. This deterioration in the polymer results in changes in molecular weight and loss of physical properties such as discoloration and loss of impact strength.

Antioxidants inhibit atmospheric oxidation and its degradative effects on a polymer system. The antioxidants minimize degradation during fabrication, storage, and end use. Hydrolytic stability and heat stability are important factors in the selection of an antioxidant. The antioxidants interrupt the degradation process in different ways, depending on their structure. The two major classifications are: (1) chain-terminating primary antioxidants; and (2) hydroperoxide decomposing secondary antioxidants.

The primary, or chain-breaking, antioxidants are stearically hindered phenols and aromatic amines. The primary antioxidants react rapidly with radicals and are often considered radical scavengers. The primary, phenolic antioxidants are superior, high temperature, long-term heat stabilizers which offer excellent resistance to discoloration and extraction. The secondary, or preventive, antioxidants are useful in synergistic combination with primary antioxidants. The secondary antioxidants are most effective at elevated temperatures and effectively protect both the polymer and the primary antioxidant. Secondary antioxidants impart processing and color stabilization when used in combination with a phenolic antioxidant in polyolefins.

We have found that the use of hydrolytically unstable compositions as antioxidants, when added to thermoplastic polymers and pro-oxidants, provide a compostable thermoplastic composition. Water (urine and moisture) and organic acids are the "triggers" in initiating the polymer degradation. The hydrolytically unstable antioxidant becomes ineffective when the composition becomes wet.

Under the "dry" melt processing, storage, and end-use conditions, the hydrolytically unstable antioxidant provides long-term shelf-life to the compostable, plastic products. Under the "wet" composting conditions, the antioxidant becomes ineffective and the thermoplastic polymer degrades oxidatively and thermally. In the presence of a pro-oxidant and an accelerator, the thermoplastic polymer degrades quickly to a brittle material which can be broken down into fragments by the mechanical actions in the municipal solid waste composting process. The molecular weight of the plastic fragments decreases quickly and continuously such that the low molecular materials can ultimately be biodegraded in the presence of microorganisms.

Useful hydrolytically unstable antioxidants include phosphorus antioxidants and biological antioxidants. The hydrolytically unstable antioxidants can be used alone or in combination with low levels of primary antioxidants. The phosphorus antioxidants generally have very low water solubility. However, these antioxidants may be removed from the thin plastic films by water or by the mechanical actions in contacting with wet municipal solid waste and sewage sludge during the municipal solid waste composting process.

In municipal solid waste and yard waste composting processes, the pH level changes with time. During the first few days, the pH level is usually about 4 to 6 due to the presence of some organic acids. The pH level rises to about 7 to 8 or up to about 9 after most of the organic acids have been consumed by micro-organisms. The pH level then changes to about 7 to 7.5 near neutral during the final composting stage. The organic acids in the composter during the first few days can make the hydrolytically unstable phosphorus ineffective as an antioxidant and degradation of the compostable composition occurs.

Other hydrolytically unstable antioxidants useful in the present invention include biological antioxidants such as Vitamins E and C. Vitamin E is a mixture of closely-related tocopherols and tocotrienols. Vitamin E is mainly dl-alpha-tocopherol (ATP) and is a chain-breaking, free radical scavenger (i.e., primary antioxidant). Vitamin C is mainly l-ascorbic acid and is a peroxide decomposer (i.e., secondary antioxidant). Vitamin E is a viscous, dark amber oil and is insoluble in water but soluble in oils and fats. Vitamin C is a crystalline powder and is soluble in water but insoluble in oils. It has limited thermal stability. Ascorbyl palmitate (l-ascorbic acid 6-palmitate) is an oil-soluble form of Vitamin C. Vitamins E and C synergize well together. The water-soluble Vitamin C, or a blend of Vitamin C and Vitamin E, or a blend of Vitamin C with other antioxidants can be used in the compositions provided in the present invention.

Polypropylene stabilization typically requires higher levels of antioxidants than does stabilization of polyethylene. Phenolic-type antioxidants are usually added to polypropylene to provide long-term stability. In the past polypropylene has been stabilized using two radical scavengers, namely BHT, and another sterically hindered phenol of higher molecular weight. BHT offers no long-term stability due to its high volatility, rather it serves as a processing stabilizer. BHT provides only an additive effect on the primary antioxidant's efficiency. We have found that replacing or supplementing the phenolic-type antioxidant (such as BHT) with a hydrolytically unstable antioxidant leads to substantially greater processing stability without incurring the discoloration problem that is associated with BHT.

The relative levels of phenolic antioxidant to hydrolytically unstable antioxidant in the compostable compositions provided by the present invention are very different from the antioxidant levels currently used in known polymer compositions. Only very low levels of phosphorus antioxidants have previously been used as secondary antioxidants in combination with much higher levels of phenolic antioxidants and metal heat stabilizers. In the compostable compositions of the present invention, hydrolytically unstable antioxidants are used as a primary additive (i.e., major component) while the phenolic antioxidant is used as a secondary additive (minor component).

| Antioxidant | Invention | Common Practice |
| --- | --- | --- |
| hydrolytically unstable (Phosphorus or biological) antioxidants | major component 400-1500 ppm or higher | minor component 400-2400 ppm |
| Phenolic antioxidants | minor component 0-300 ppm | major component 800-1200 ppm |

Various commercial phosphorus antioxidants which are useful in the present invention are listed below in Table I in the order of increasing in hydrolytic stability.

TABLE I

| Supplier | Trade Name | Chemical Name |
| --- | --- | --- |
| G.E. | Weston ® 618 | Distearyl-pentaerythritol-diphosphite |
| Argus | Mark ® 1050 | |
| G.E. | Ultranox ® 626 | Bis(2,4-di-tert-butylphenyl)-pentaerythritol-diphosphite |
| Uniroyal | Naugard ® P | Tris (nonylphenyl) phsophite, TNPP |
| Goodyear | Polygard ® | Tris (nonyl phenyl) phosphite |
| -Sandoz | Sandostab ® P-EPQ | Tetrakis (2,4-di-tert-butyl-phenyl)-4-,4'-bi-phenylenediphosphonite |
| Ciba Geigy | Irgafros ® P-EPQ FF | Di-tert-butyl phosphonite condensation product with biphenyl-or-tetrakis (2,4-di-tert-butyl-phenyl)-4,4'biphenylene diphosphonite |
| Ciba Geigy butylphenyl) | Irgafos ® 168 | Tris (2,4-ditert-phosphite |
| Uniroyal | Naugard ® 524 | tris (2,4-di-tert-butylphenyl) phosphite |
| Ethyl | Ethanox ® X-398 | 2,2'-ethylidenebis (4,6-di-tertbutyphenyl) fluorophosphonite |

The high molecular weight phosphonite compounds such as P-EPQ are more stable to hydrolysis than some organic phosphites. The fluorine atom gives the Ethanox ® X-398 superb hydrolytic and thermal stability. Ethanox ® X-398 can be used alone without phenolic antioxidant. However, a blend of these phosphorus antioxidants and some other antioxidants can also be used. Weston ® 618 and Mark ® 1050 are very hydrolytically unstable. As such, when used in the compostable compositions of the present invention the Weston ® 618 or Mark ® 1050 phosphorus antioxidants can be combined with a low level of a primary antioxidant. To improve hydrolysis resistance, some phosphorus antioxidants such as Weston ® 619 (distearylpentaerythritol-diphosphite and Naugard ® PHR (tris (nonylphenyl) phosphite) contain up to about 1.0% triisopropanol amine.

In the compostable compositions of the present invention, one preferred amount of a phenolic antioxidant can be about 200 to 300 ppm and the weight ratio can be about 2:1 to about 4:1 or 5:1 weight ratio of hydrolytically unstable antioxidant-to-phenolic antioxidant. In certain embodiments the amount of hydrolytically unstable antioxidants can be in the range of about 400 ppm to 1500 ppm or higher.

Useful primary phenolic antioxidants in the compositions of the present invention include BHT and Ciba-Geigy's Irganox ® 1076. Irganox ® 1076 is not as active as BHT but it does not have the discoloration problems of BHT. The chemical name of Irganox ® 1076 is octadecyl 3,5 di-tert-butyl-4-hydroxyhydrocinnamate.

C. Pro-Oxidants (Pro-Degradants)

Organic or inorganic salts and complexes of polyvalent transition metals can be used as pro-oxidants (or pro-degradants) in the practice of this invention. The pro-oxidant is the catalyst in the oxidative and thermal degradation of thermoplastic polymer.

Intervening between groups II and III in the Periodic Table are subgroups of elements collectively referred to as the "transition elements". One of the most frequently marked characteristics of a typical transition element is the great variety of oxidation states it may show in its compounds. Transition metals are usually capable of electron transitions between their outer shells and the variable valency states thus rendering them capable of inducing oxidation reactions.

Typical transition metal salts and complexes may be used as the pro-oxidants in practice of this invention. Preferred pro-oxidants to be used in the compositions of this invention are transition metal salts of stearates, oleates, linoleates, palmitates, erucates, behemates, myristates, naphthenates, neodecanoates, octoates, tallates, acetonyl, acetonates, hydroquinolinates, and metalamine salt complexes. Preferred transition metals whose salts and complexes are useful as pro-oxidant in the compositions of the present invention include manganese, cerium, and iron (Mn, Ce and Fe). Some cerium or iron salts and complexes such as iron stearate, cerium stearate, and cerium caprylate/caprate are common photo-degradable additives. A mixture of these transition metal salts and complexes with a manganese salt or complex is one example of a desirable pro-oxidant useful in the compostable compositions of the present invention.

Many governmental regulatory institutions have very restrictive standards on the contents of several toxic or "heavy metals", such as zinc, copper, lead, nickel, cadmium, chromium, and mercury, in the final compost product. Thus, in the compositions of compostable films, the metal salts and complexes of certain toxic heavy metals are excluded.

The amount of transition metal in the compostable compositions of the present invention depends upon the type and the amount of antioxidant used and the desired oxidation rate and can be present in an amount of about 5 to about 10%, by wt., based on the weight of the thermoplastic polymer. A preferred range of pro-oxidant is about 0.01 to about 1.0% by weight of active metal (i.e., Mn, Ce, Fe or the like) in the compositions based on the weight of the thermoplastic resin polymer.

D. Accelerators

Organic and inorganic accelerators are normally used for high speed vulcanization in rubber compounding. Typical organic accelerators are thiazoles, dithiocarbamates, thiurams, thioureas, thiadiazines, sulfenamides, xanthates, isophthalates, guanidines, and aldehyde-amines. Ketones and quinones, such as benzophenone, diacety, p-quinone, 1,4-naphthoquinone, 1,2-benzan-thraquinone and 2-methylanthraquinone, are useful to initiate or accelate photodegradation. Anatase titanium dioxide ($TiO_2$) is useful as a photodegradable additive for polyolefin films. These organic accelerators and photodegradable additives can all be used in the compositions of this invention to accelerate the decomposition of the compostable films during composting process.

Transition metal complexes of dithiocarbamate and dithiophosphate are photo-sensitizing agents useful in photodegradable plastic films. The iron dialkydithiocarbamates are very much less stable in the presence of light than are the nickel or cobalt complexes. In low concentrations, iron dimethyldithiocarbamate (FeDMC) is a melt stabilizer but photo-activator for photo-oxidation of polyolefins. At higher concentrations, however, it gives rise to a photo-induction period similar to but shorter than the nickel complex. At the end of the induction period, the liberated ionic iron results in a much more rapid rate of photo-oxidation than occurs in its absence. Thus, by varying the concentration it is possible to vary the lifetime of the polymer controllably over a wide time scale.

Iron or manganese, and cerium dithiocarbamates are useful photoactivators and can be used as the accelerators in the compositions of this invention. Various other transition metal dithiocarbamates such as nickel, cobalt, and zinc dithiocarbamates are commonly used as antioxidants or UV light stabilizers for polyolefins.

Various organotin compounds, such as dibutyl tin dilaurate, dibutyl tin dilaurate, tin carboxylate, are useful as heat and light stabilizers in flexible vinyl formulations and in rigid vinyl resin extrusions. They are also used in stabilization of chlorinated paraffins and other chlorinated organic materials. The organotin compounds are useful as a polyurethane catalyst. In some polyolefin resin blends, they are useful as the heat stabilizers for phosphorous-containing flame retardant additives. The amount of an organotin compound depends on the amount of the flame retardants. The organotin compounds can react with the phosphorous hydrolytically unstable antioxidants to make them unstable.

A number of low molecular weight materials such as polyethylene glycols, polypropylene glycols, sorbitol, lanolin products, methyl glucoide products, tackifying resins, and plasticizers are also useful accelerators. They are very susceptible to oxidation due to their chemical structure which include carbon-carbon double bonds, aromatic rings, phenol groups, or carbonylic groups and which are particularly susceptible to oxidation. Others have ester groups will hydrolyze over time. These functional groups can greatly enhance the compostability of the compostable films which contain a small percent of these low molecular weight materials.

A number of other materials such as unsaturated liquid elastomers, unstabilized thermoplastic elastomers, biodegradable polymers, biodegradable additives (starch and cellulose), water soluble polymers, and photodegradable additives are also useful accelerators as well as property modifiers.

The compositions of the present invention can contain one or more of the following polymers as accelerators:

1. Hydrophilic Polymers (Water-Soluble and Water-Swellable Polymers):

Gelatins, proteins, polysaccharides, alkyl cellulose, hydroalkyl celluloses, hydroalkylalkyl celluloses, cellulose esters, hydroalkyl cellulose esters, polyacrylates, polymethacrylates, and polyvinyl alcohols.

2. Biodegradable or Hydrolyzable Thermoplastic Polymers

Polyhydroxybutyrate homopolymers (PHB), polyhydroxybutyrate-valerate copolymers (PHBV), poly-alpha-caprolactones (PCL), hydrolyzable polylactic acids and copolymers of lactic acids, and hydrolyzable copolyesters such as copolymers of butylene terephthalate and oxalate.

In addition, various organic peroxides, unsaturated liquid elastomers, and polymeric plasticizers, are useful as organic accelerators. The unsaturated liquid elastomers and the polymeric plasticizers are also useful as the property modifiers.

A large number of organic peroxides are useful as accelerators including hydroperoxides, diacyl peroxides, ketone peroxides, peroxyesters, dialky peroxides, peroxydicarbonates, peroxyketals, peroxy acids, acyl alkylsulfonyl peroxide, and alkyl monoperoxydicarbonates. These organic peroxides or a mixture of two or more organic peroxides can be used as accelerators. Various organic peroxides useful as chain-breakers for polypropylene and as crosslinking agent for polyethylene are dialkyl peroxides. AtoChem's Lupersol ® 101 (or R. T. Vanderbilt's DBPH) is a suitable organic peroxide for these applications. It is in the dialkyl peroxide group with the chemical name of 2,5-dimethyl-2,5,-di-(t-butylperoxy) hexane.

AtoChem's Poly bd ® resins are liquid, hydroxyl-terminated homopolymers of butadiene. Poly bd ® resins are reactive under oxidative conditions to yield internally cross-linked materials. A small amount of Poly bd ® resin or other types of liquid rubber (elastomer) can be added to provide some unsaturations (i.e., double bonds) which may generate free radicals or increase the rate and degree of chain scission.

Polymeric plasticizers have higher molecular weights and good resistance to migration. They have low volatility (i.e., high flash point). Plasticizers are susceptible to auto-oxidation and to fungal and bacterial attack. Many high molecular weight, polymeric plasticizers such as polyester-based plasticizers, polyglycols, glutarates, adipates, and paraplex, can be used as accelerators and property modifiers. The compostable compositions of the present invention preferably comprise from about 0.05 to about 5.0%, by wt., based on the weight of the thermoplastic polymer, of at least one accelerator or mixtures thereof.

Non-limiting examples of suitable accelerators which can be used in the compositions of this invention are listed below in Table II:

TABLE II

| Supplier | Trade Name | Chemical or Common Name |
|---|---|---|
| Union Carbide | Polox ® | Polyethylene oxide |
| Union Carbide | Tone ® Polymer | Poly-alpha-caprolactone - biopolymer |
| Shell | Kraton ® | Styrenic block copolymers |
| Firestone | Stereon ® | Styrenic block copolymers |
| Dexco | Vector ® | Styrenic block copolymers |
| R.T. Vanderbilt | Altax ® | Bebzothiazyl disulfide |
| R.T. Vanderbilt | Captax ® | 2-mercaptobenzothiazole |
| R.T. Vanderbilt | Methyl Cumate | Copper dimethyl dithiocarbamate |
| R.T. Vanderbilt | Methyl Ethyl Tuads | Teramethylthiuram di-sulfide and tetraethyl-thiuram disulfide |
| Akzo | Stanclere ® TM | Dibutyl tin maleate |
| Mooney Chemical | — | Dibutyl tin dilaurate |
| Witco/Argus | Mark ® | Organotin compounds |
| Ferro | Cata-Chek ® | Organotin compounds |
| Ferro | Thermo-Chek ® | Organotin compounds |
| Union Carbide | Carbowax ® | Polyethylene glycols (PEG) |
| Dow Chemical | Polyglycol | |
| Union Carbide | Propylene Glycol | Polypropylene glycols (PPG) |
| Dow Chemical | Polyglycol | |
| Pfizer | — | Sorbitol (D-glucitol) |
| Amerchol | Lanogel ®, Solulan ®, etc. | Lanolins |

TABLE II-continued

| Supplier | Trade Name | Chemical or Common Name |
|---|---|---|
| Amerchol | Amerlate ® | Lanolin acids |
| Amerchol | Amerlate ® | Isopropyl lanolates |
| Amerchol | Glucam ® | Methyl gluceth distearates |
| Amerchol | Glucate ® | Methyl glucose dioleates |
| Ato-Chem | Poly bd ® Resin | Liquid, hydroxyl terminated polymers of butadiene |
| Ethyl | Ethylflo ® | Amorphous poly-alpha-olefins |
| Rexene | Rextac ® | Amorphous poly-alpha-olefins |
| Huls | Vestoplast ® | Amorphous poly-alpha-olefins |
| Viking Chemical | Viklox ® | Epoxidized Alpha-olefins |
| Air Products | Vinex ® | Polyvinyl alcohol (PVOH) |
| — | — | Starch - biodegradable additive |
| — | — | Cellulose - biodegradable additive |
| — | — | Anatase $TiO_2$ - photodegradable additive and white pigment |
| — | — | Various plasticizers |
| — | — | Various tackifying resins |

E. Property Modifiers

The compostable films made of homopolymers and copolymers of polypropylene may lack several film properties such as tear strength and impact strength. Therefore, suitable property modifiers can be used to enhance certain film properties and/or the compostability of the compostable films. The compostable compositions of the present invention can contain one or more of the following polymers as property modifiers.

1. Substantially water-insoluble hydrohydrobic, thermoplastic polymers including polyethylene (low density, medium density), polyisobutylenes, polyvinyl acetates, polystyrenes, polyacrylonitriles (PAN), polyacrylates, polymethacrylates, polyacetals, polyamides, polyesters, polyurethanes, polycarbonates, poly(alkylene terephthalates), polyarylethers, polyimides, and poly(alkylene oxides);

2. Substantially water-insoluble hydrohydrobic, thermoplastic copolymers including for example, alkylene-vinyl ester copolymers preferably ethylene-vinyl acetate copolymers (EVA), alkylene-acrylates or methacrylates copolymers preferably ethylene-acrylic acid copolymers (EAA), ethylene-ethyl acrylate copolymers (EEA), ethylene-methyl acrylate copolymers (EMA or EMAc), ABS copolymers, styrene-acrylonitrile copolymers (SAN), ethylene-maleic anhydride copolymers, acrylic acid esters-acrylonitrile copolymers; block copolymers of ester-amides or ether-amides, block copolymers of ester-urethanes or ether-urethanes, and thermoplastic copolyesters such as copolymers of butylene terephthalate and glutarate; and, 3. Biodegradable or hydrolyzable thermoplastic polymers including, for example, polyhydroxybutyrate homopolymers (PHB), polyhydroxybutyrate-valerate copolymers (PHBV), poly-alpha-caprolactones (PCL), hydrolyzable polyactic acids and copolymers of lactic acids, and hydrolyzable copolyesters such as copolymers of butylene terphthalate and oxalate.

Non-limiting examples of suitable property modifiers are listed below in Table III:

TABLE III

Property Modifiers

| Supplier | Trade Name | Chemical or Common Name |
|---|---|---|
| Union Carbide | Tone ® Polymer | Poly-alpha-caprolactone |
| ICI | Biopol ® | Polyhydroxybutyrate (PHB) and Polyhydroxy-butyrate-valerate (PHBV) Ethylene-based Copolymers and Elastomers |
| Dow Chemical | Primacor ® | Ethylene-acrylic acid copolymers (EAA) |
| Du Pont | Nucrel ® | Ethylene-methacrylic acid copolymers (EMAA) |
| Quantum | Ultrathene ® | Ethylene-vinyl acetates (EVA) |
| Quantum | Enathene ® | Ethylene-normal-butyl-acrylate (EnBA) |
| Union Carbide | — | Ethylene-ethyl acrylates (EEA) |
| Chevron | — | Ethylene-methyl acrylates (EMAC) |
| Exxon | Exxelor ® | Ethylene-propylene copolymers (EP) Ethylene-propylene rubbers (EPR) |
| Copolymers | EPsyn ® | Ethylene-propylene-diene-monomer rubbers (EPDM) |
| Quantum/EVCAL | EVAL ® | Ethylene-vinyl alcohol copolymers (EVOH) |
| Shell | Kraton ® | Styrenic block copolymers |
| Firestone | Stereon ® | Styrenic block copolymers |
| Dexco | Vector ® | Styrenic block copolymers |
| Morton Int'l | Morthane ® | Thermoplastic polyurethanes (TPUs) |
| Dow Chemical | Pellethane ® | Thermoplastic polyurethanes (TPUs) |
| B.G. Goodrich | Estane ® | Thermoplastic polyurethanes (TPUs) |
| Du Pont | Hytrel ® | Copolyesters |
| Eastman | Ecdel ® | Copolyesters |
| G.E. | Lomod ® | Copolyesters |
| GAF | Gaflex ® | Copolyesters |
| Dow Chemical | Estamid ® | Polyesteramides (PESA) |
| Ato-Chem | Pebax ® | Polyetheresteramides (PEEA) |
| Emser | Grilon ® | Polyetheramides (PETA) |

Many biodegradable aliphatic polyesters, such as Union Carbide's Tone ® Polymer poly-alpha-caprolactone, ICI's Biopol ® polyhydroxybutyrate (PHB) and polyhydroxy-butyrate-valerate (PHBV), and other poly(alphahydroxyalkanoates) are useful property modifiers as well as useful accelerators for use in the compositions of the present invention. The Tone ® Polymer is mechanically miscible with polyolefin resins and has a sharp and low melting point of 60° C. (140° F.). The compostable compositions containing a small percent of Tone ® Polymer can break down quickly when the composting temperature is in the range of about 60° to 71° C. (140° to 160° F.). Tone ® Polymer can eventually be biodegraded in the presence of microorganisms.

A great number of ethylene copolymers and thermoplastic elastomers (TPEs) are also useful property modifiers in the compositions of the present invention. The TPEs include thermoplastic polyolefin elastomers (TPOs), thermoplastic styrenic elastomers, thermoplastic polyurethane elastomers (TPUs), thermoplastic copolyester elastomers, and thermoplastic polyamide elastomers.

Styrenic copolymers, such as Kraton ®, Stereon ®, and Vector ® are very useful TPEs as property modifiers as well as accelerators in the compositions of the present invention. Kraton ® D series rubbers and compounds are linear, block copolymers of styrene-butadiene-styrene (SBS), styrene-isoprene-styrene (SIS), or branched or diblock copolymers of styrene-butadiene (SB). Due to their chemical structure, (the many double bonds located along the rubber segment), these copolymers are inherently susceptible to oxidation. Generally, Kraton ® D rubbers and compounds can remain functional up to temperatures of about 66° C. (150° F.). At about 60° to 71° C. composting temperature, the compostable films containing a small percent of unstabilized Kraton ® D rubber or compound can breakdown quickly to small molecular weight materials and become very brittle.

TPUs are a member of the family of polyurethanes and can be categorized into polyester and polyether types. The basic ingredients of TPUs are diisocyanates and long-chain and short diols. The diisocyanates and short-chain diols form the basis of hard segments, while the long-chain diols provide the basis of soft segments. Because TPUs contain ester (or ether) and urethane linkage, some degree of hydrolysis will inevitably occur. The ester-based TPUs are less hydrolytically stable than caprolactone-based and ether-based TPUs. Although the urethane linkage can be hydrolyzed, ester linkage cleavage is the primary route for hydrolytic degradation of ester-based TPUs. The hydrolysis of urethane linkages, on the other hand, is the major means of decomposition of ether-based TPUs.

The oxidative process plays a major role in the decomposition of ether-based TPUs. The ester-based TPUs normally exhibit considerably better thermal and oxidative stability than the ether-based ones. The ester-based TPUs are useful in the compositions of the present invention because polyester-based TPUs are less hydrolytically stable and they are biodegradable. In certain embodiments the ester-based TPUs made from aliphatic isocyanates are more preferred than the ester-based TPUs made from aromatic isocyanates. TPUs with an aromatic isocyanate may potentially generate toxic aromatic amines during breakdown.

Du Pont's Hytrel ® copolyester elastomers have a copolyetherester randomized hard-soft segment structure produced by condensation of dimethyl terphthalate with tetramethylene and polytetramethylene ether glycols. Eastman's Ecdel ®, G.E.'s Lomod ®, and GAF's GAF ® are different versions of copolyester elastomers. Resistance to polar fluids, including water, acids, bases, amines, and glycols, is a function of the composition of the polymer, pH, and temperature of use. These copolyesters are attacked by polar fluids at temperature 70° C. (158° F.).

Ato Chem's Pebax PEEAs consist of first forming an adipic acidcapped hard-segment block of poly(11-amino-undecanoic) which is joined by a soft segment of polyol such as polyoxyethylene glycol, polyoxypropylene glycol, or polyoxytetramethylene glycol, in a polyesterification process. In the Dow process an acid-terminated soft segment is formed first, by estification of a polyoxyalkylene or other glycol. This is reacted, along with additional diacid, with a diisocyanate to form the polyesteramide (PESA), in which the hard segments are the amides formed from the additional diacid and the diisocyanate. Thermoplastic polyamide elastomers exhibit properties that depend on the chemical composition of the hard (polyamide) and soft (polyether, polyester, or polyetherester) blocks as well as their segment lengths. The chemical composition of the soft segment is important in determining resistance to humid aging. Most ester-based TPEs including the polyamides are susceptible to hydrolysis, which reduces the properties by lowering the polymer molecular weight. The ester-based PESA elastomers are more sensitive to the presence of water than ether-based PETA elastomers.

The compostable compositions of the present invention preferably comprise from about 1% to about 50%, more preferably, from about 5% to about 15% by weight of a property modifier or a mixture of property modifiers, based on the weight of the thermoplastic resin polymer.

F. Optional Components

In addition to the above-mentioned components, the compostable compositions of the present invention may contain other components which include, but are not limited to, heat stabilizers, flame retardants, pigments, antiblocking agents, antistatic agents, slip agents, inorganic fillers, lubricants, plasticizers, and the like. Typical inorganic fillers are oxides of titanium, aluminum, silicon, magnesium and the like. Typical antiblocking agents are silica or talc, or other powdered materials. Typical antistatic agents include ethoxylated amines and quarternary amine salts. Typical slip agents include those commonly derived from amides of fatty acids. Typical lubricants are stearates of aluminum, calcium, magnesium, and tin, talc, silicones, and the like. Typical plasticizers are low molecular weight poly(alkylene oxides), organic plasticizers of low molar masses such as glycerol, sorbitol and the like.

A typical polyolefin resin can contain from 0 to 0.1%, by wt., of a slip agent and from 0 to 0.6%, by wt., of an antiblocking additive, based on the weight of the thermoplastic resin polymer. Diatomaceous silica is an effective antiblocking additive in film and sheet at a level of 0.05% to 0.5% by wt., based on the weight of the thermoplastic polymer.

One preferred white pigment is a mixture of rutile and anatase titium dioxides ($TiO_2$) since the anatase $TiO_2$, a photodegradable additive, can be used as an accelerator as well as a white pigment in the compostable compositions. For a white compostable composition, the amount of $TiO_2$ can be in the range of about 3% to about 8% by wt., based on the weight of the base polymer.

FILM PROCESSING

The compostable compositions of the present invention can be processed to produce thermoplastic films of blended polymers (such as blown-film process, a cast-film process, or an extrusion coating process). The compostable film can be either single-layer or multilayer. The compostable films can be embossed (for example, using a thermal film embossing process) to impart special fine patterns in order to reduce gloss and to improve appearance and handleability. The compostable films can be surface treated with corona discharge and can be also printed or laminated. The compostable films can also be oriented uniaxially or biaxially to improve certain film properties such as tensile strengths and moisture barrier properties.

In certain embodiments of the present invention a three-layer coextruded compostable film is desirable. The core layer comprises a hydrolytically unstabilized thermoplastic polymer and the two outer, or skin, layers comprise compostable compositions provided by the present invention. For example, the core layers can comprise any of the following compositions: an extrudable, biodegradable, water-soluble polymer such as Air Products' Vinex ® resin (a cold-water of hot-water soluble grade polyvinyl copolymer) or Union Carbide's Polyox ® (a cold-water soluble, polyethylene oxide resin; a biodegradable polymer such as union Carbide's Tone ® Polymer (polycaprolactone); a biodegradable starch/polymer blend such as Novamont's Mater-Bi ® resin (or Warner-Lambert's Novon ® resin); or a blend of two or more of the above biodegradable materials. The core layer may contain a polymeric polasticizer (such as the polyester-based plasticizers—glutarates, paraplex, and the like) and/or a monomeric plasticizer. Under "dry" conditions, the skin layers can protect the core layer from oxidative/thermal degradation. Under the "wet" composting conditions, the thin skin layers can break-down quickly to expose the unstabilized core layer to oxygen to cause rapid break down of the entire film structure.

Most of the above-mentioned components, such as antioxidants, pro-oxidants, antiblocking agents, antistatic agents, slip agents, plasticizers, and the like, are supplied in the form of either powder or liquid while the unstabilized thermoplastic polymers and most of the property modifiers are supplied in pellets. In certain embodiments of the present invention, it is preferred to prepare these components in concentrates using a polymeric material as the carrier resin. The additives and the carrier resins can be compounded and pelletized in a twin-screw compounding extruder/pelletizing system to form concentrates in pellets. The concentrates can then be dry blended with the unstabilized thermoplastic polymers and the property modifiers to make-up the compostable compositions provided by the present invention. For example, the preferred carrier resins can be the Tone ® Polymer or an ethylene-based copolymer such as ethylenemethacrylic acid copolymers (EMAA).

The compostable film samples discussed in the examples below were prepared on a small blown-film extrusion system consisting of 1-¼" extruder, 24:1 L/D (length-to-diameter) general purpose polyolefin screw, 3" blown-film die, small air ring, blown film tower, and small winder. The blow-up ratio (the ratio of bubble size to die size) in the blown-film runs was kept in the range of 1.75 to 2.5. The film thickness was in the range of 0.001" to 0.002".

FILM TESTINGS

The compostable film samples were tested for physical properties and molecular weights "before" and "after" oven testing and composting testing. The physical properties of these compostable film samples were tested using ASTM methods. The molecular weights of some selected film samples were determined by gel permeation chromatography (GPC). Infra-red (IR) spectrograms of selected film samples were obtained.

The size of the rotating composters is 3-ft. in diameter and 3-ft. in length. The rotating composters have a door in the middle and one vent hole on each side wall. The old composter was rotated manually once a day. The new composter was rotated continuously by a motor at 1 to 3 rpm. The new rotating composter has four baffles on the inside wall. Air bleeding is supplied by a small air compressor from one side of the shift into the new composter. The composing temperature, pH, and moisture level were measured daily. A moisture meter for house plants was used to check the moisture level. It has a wetness scale of 0 to 12.

The compost mixture consists of a mixture of rabbit chow, shredded newspaper, composted cow manure, sand, gravel, wooden blocks, water, and plastic film test samples (8½"×11" in size). The carbon-to-nitrogen (C/N) ratio of the fresh compost mixture is approximately 26:1. The rabbit chow provides protein, fiber, and fat into the mixture. The newspaper provides carbon source. The cow manure provides micro-organisms. The sand, gravel, and wooden blocks provide mechanical actions during turning of the composter to simulate the municipal solid water composting.

The ambient control samples (FS-1) were film samples before oven and composting tests. The 10-day oven samples (FS-2) were film samples after 10 days in a forced air dry oven at 60° C. (140° F.). The 10-day wet oven (QUV chamber) samples (FS-3) were film samples after 10 days in a QUV chamber, which has a water bath and without the UV light, at 60° C. The 10-day composting samples (FS-4 and FS-6) were film samples after composting in the old (FS-4) or new (FS-6) rotating composter. The 30-day composting samples (FS-5) were film samples after composting in the first 10 days in the old rotating composter and an additional 20 days in a windrow. The other 30-day composting samples (FS-7) were film samples after 30 days composting in the new rotating composter.

The following specific examples will illustrate the present invention. The film compositions were made using a dry blend of (i) an unstabilized ethylene-propylene random or impact copolymer (EPCP) base resin, (ii) a hydrolytically unstable antioxidant or a blend, (iii) a pro-oxidant or a blend thereof, (iv) an accelerator or a blend thereof, (v) an unstabilized property modifier or a blend thereof. The EPCP based resin and ethylene-carbon monoxide (ECO) used in these examples were supplied in pellet form and the other additives were in concentrate form.

The following examples illustrate the practice of the present invention but are not intended to be limiting thereof.

EXAMPLES 1-8

The blown-film samples were prepared from a composition containing a dry blend of EPCP resin, antioxidant, pro-oxidant, accelerator, and property modifier. The descriptions of the components is shown in Table IV below. The compositions of seven compostable film samples in Examples 1-7 are listed in Table V. The compositions are expressed in parts by weight per 100 parts by weight of EPCP base resin (phr). The physical properties (tensile strength and elongation) and molecular weight of these original film samples (FS-1) were obtained. The film samples (8½" by 11" in size) were placed in a dry oven, a wet oven (QUV chamber), an old manually rotated composter, or a new electrically rotated composter for a testing period of 10 or 30 days. After the oven and composting tests, the tensile strength and elongation of these film samples (i.e., FS-2 to FS-6) were obtained. The physical properties and the molecular weight results are listed in Table VI below. The film sample in Example 8 is a conventional noncompostable, polyethylene-based disposable diaper backsheet.

TABLE IV

| Symbol | Description of The Components |
|---|---|
| | Components |
| PP-1 | Polypropylene base-random EPCP (6% ethylene content, 1.6 melt flow rate) |
| PP-2 | Polypropylene base-random EPCP (6% ethylene content, 0.9 melt flow rate) |
| AO-1 | Antioxidant-Weston ® 618 concentrate (5% by wt. of in Nucrel ® EMAA) |

TABLE IV-continued

Description of The Components

| Symbol | Components |
|---|---|
| AO-2 | Antioxidant-Naugard ® BHT concentrate (5% by wt. in EMAA) |
| AO-3 | Antioxidant-Naugard ® P concentrate (5% by wt. in EMAA) |
| AO-4 | Antioxidant-Rontex ® 201 (Vitamin E) concentrate (5%, by wt. in EMAA) |
| AO-5 | Antioxidant-Rontex ® 100 (water soluble Vitamin C) concentrate (5% by wt. in EMAA) |
| AO-6 | Antioxidant-Ascorbyl palmitate (oil soluble Vitamin C) concentrate (5% by wt. in EMAA) |
| PO-1 | Pro-oxidant-Manganese stearate concentrate (23% by wt. in EMAA) |
| AC-1 | Accelerator-Captax ® concentrate (5% by wt. in EMAA) |
| AC-2 | Accelerator-Therm-chek ® 837 concentrate (5% by wt. in EMAA) |
| AC-3 | Accelerator-Dibutyl-tin-dilaurate concentrate (5% by wt. in EMAA) |
| AC-4 | Accelerator-Therm-chek ® 840 concentrate (5% by wt. in EMAA) |
| AC-5 | Accelerator-Cata-chek ® 820 concentrate (5% by wt. in EMAA) |
| AC-6 | Accelerator-Stanclere ® concentrate (5% by wt. in EMAA) |
| PM-1 | Property modifier-ECO copolymer (5.2% CO content, 3 melt index) |
| PM-2 | Property modifier-Pellethane ® TPU 2355-85ABR |
| PM-3 | Property modifier-Tone ® Polymer P-787 |
| PM-4 | Property modifier-Exxelor ® PA 20-2 |

TABLE V

The Compostable Film Compositions
Weight, parts per 100 parts of Base Resin (phr)

| | Examples | | | | | | |
|---|---|---|---|---|---|---|---|
| | 1 | 2 | 3 | 4 | 5 | 6 | 7 |
| PP-1 | 100 | 100 | 100 | 100 | 100 | 100 | 100 |
| AO-1 | 0.6 | 0.6 | 1.2 | 0.9 | 0.6 | 0.6 | 0.6 |
| AO-2 | 0.2 | 0.2 | 0.4 | 0.3 | 0.2 | 0.2 | 0.2 |
| PO-1 | 5 | 10 | 5 | 7.5 | 5 | 5 | 10 |
| AC-1 | 4 | 4 | 4 | 6 | 4 | 4 | 8 |
| PM-1 | — | — | — | — | — | 20 | 20 |
| PM-2 | — | — | — | — | 10 | — | — |

The test results shown in Table VI below indicate that the compostable film samples (Examples 1–7) had large decreases in tensile strength and elongation after composting or 10-day in a wet oven. The compostable films were very stable after 10 days in a dry oven and their physical properties and molecular weights were unchanged. The film samples of conventional polyethylene-based diaper backsheet (Example 8) had no significant change in physical properties and molecular weights. The physical properties of all film samples had significant changes after 10 days composting in the new composter. The data for several of these samples shows the molecular weight degradation for the 10- and 30-day composting samples.

TABLE VI

Tensile Strength, Elongation and Molecular Weight of Film Samples

| | EXAMPLES | | | | | | | |
|---|---|---|---|---|---|---|---|---|
| Samples | 1 | 2 | 3 | 4 | 5 | 6 | 7 | 8 PE Film |
| MD Tensile Strength, grams | | | | | | | | |
| FS-1 | 4012 | 3760 | 2973 | 4070 | 3189 | 2666 | 3490 | 2456 |
| FS-2 | 3981 | 3800 | 4410 | 3950 | 3143 | 2152 | 2953 | 2543 |
| FS-3 | 530 | 659 | 497 | 2966 | 2347 | 2562 | 3119 | 2531 |
| FS-4 | 1901 | 3031 | 2507 | 2856 | 1837 | 2740 | 1762 | 2092 |
| FS-5 | 1994 | 3424 | 2143 | 1277 | 2290 | 1835 | 396 | — |
| FS-6 | * | 889 | * | 900 | — | — | — | 631 |
| MD Elongation, % | | | | | | | | |
| FS-1 | 551 | 571 | 500 | 542 | 508 | 544 | 602 | 368 |
| FS-2 | 546 | 570 | 585 | 599 | 502 | 437 | 586 | 368 |
| FS-3 | 488 | 523 | 468 | 495 | 499 | 569 | 568 | 380 |
| FS-4 | 514 | 433 | 395 | 450 | 448 | 500 | 316 | 263 |
| FS-5 | 130 | 506 | 228 | 10 | 196 | 198 | 377 | — |
| FS-6 | * | 13 | * | 13 | — | — | — | 19 |
| Weight Average Molecular Weight, Mw × 1/1000 | | | | | | | | |
| FS-1 | 204 | 193 | 175 | 186 | 160 | 148 | 151 | 83 |
| FS-2 | 196 | 193 | 190 | 186 | 163 | 149 | 156 | 84 |
| FS-3 | 218 | 217 | 227 | — | 183 | 167 | 168 | — |
| FS-4 | 170 | 181 | 154 | 183 | 165 | 141 | 146 | 85 |
| FS-5 | 24 | 187 | 42 | 121 | 158 | 29 | 151 | 79 |
| Polydispersity (Mw/Mn) | | | | | | | | |
| FS-1 | 5.5 | 4.7 | 5.4 | 4.2 | 5.0 | 5.3 | 5.3 | 3.6 |
| FS-2 | 4.9 | 4.9 | 4.8 | 5.3 | 4.6 | 5.3 | 6.8 | 3.5 |
| FS-3 | 5.8 | 6.0 | 4.6 | — | 4.9 | 5.3 | 4.8 | — |
| FS-4 | 4.2 | 4.3 | 4.2 | 7.4 | 4.9 | 6.6 | 5.1 | 3.2 |
| FS-5 | 4.8 | 6.0 | 6.7 | 9.7 | 1.6 | 4.3 | 8.2 | 3.6 |

*Could not identify samples
Composting condition:
FS-5 65–70° C., ph 7–8, wetness scale of 10
FS-6 12–31° C., pH 4–5, wetness scale of 10+

The ratio of the weight-average molecular weight ($\overline{M}w$) and the number-average molecular weight ($\overline{M}n$) is a measure of the polydispersity of the polymer. $\overline{M}w$ is particularly sensitive to the presence of high molecular weight species, whereas $\overline{M}n$ is influenced more by species at the lower end of the molecular weight distribution. The large drops in the weight-average and number-average molecular weights and the large increases in polydispersity indicate that the compostable compositions have a large reduction in high molecular weight species. The compostable compositions of the present invention were degraded by chain scission in the composting process.

EXAMPLES 9-15

The blown-film samples in Examples 9 to 14 were prepared and tested the same way as the previous film samples. The compositions of these compostable films samples are listed in Table VII below. The physical properties (tensile strengths and elongations) of these compostable film samples and a conventional non-compostable, polyethylene-base diaper backsheet (Example 15) are listed in Table VIII below.

TABLE VII

The Compostable Film Compositions
Weight, parts per 100 parts of Base Resin (phr)

| | EXAMPLES | | | | | |
|---|---|---|---|---|---|---|
| | 9 | 10 | 11 | 12 | 13 | 14 |
| PP-1 | 100 | 100 | 100 | 100 | 100 | 100 |
| AO-1 | 1.0 | 2.0 | — | — | 1.25 | 2.5 |
| AO-2 | 0.25 | 0.5 | 0.25 | 0.5 | — | — |
| PO-1 | 5 | 5 | 5 | 5 | 5 | 5 |
| AC-1 | 1.2 | 1.2 | 1.2 | 1.2 | 1.2 | 1.2 |
| AC-2 | 0.6 | 0.6 | 0.6 | 0.6 | 0.6 | 0.6 |

TABLE VIII

Tensile Strength and Elongation of Film Samples

| | EXAMPLES | | | | | | 15 PE Film |
|---|---|---|---|---|---|---|---|
| Samples | 9 | 10 | 11 | 12 | 13 | 14 | |
| | MD Tensile Strengths, grams | | | | | | |
| FS-1 | 3492 | 4153 | 4072 | 3830 | 3291 | 4154 | 2456 |
| FS-2 | 3240 | 3312 | 3134 | 2402 | 3259 | 1867 | 1963 |
| FS-3 | 2340 | 3336 | 3273 | 2726 | 3410 | 3126 | 2082 |
| FS-4 | 2179 | 2792 | 2374 | 3773 | 1763 | 2928 | 2502 |
| FS-6 | 1274 | 1285 | 1138 | 1341 | 1294 | 1043 | 1256 |
| FS-7 | * | 927 | * | 832 | * | * | 519 |
| | MD Elongation, % | | | | | | |
| FS-1 | 417 | 463 | 497 | 505 | 422 | 494 | 368 |
| FS-2 | 353 | 363 | 369 | 280 | 374 | 254 | 245 |
| FS-3 | 286 | 383 | 404 | 267 | 436 | 415 | 263 |
| FS-4 | 255 | 337 | 368 | 449 | 254 | 398 | 374 |
| FS-6 | 74 | 97 | 85 | 92 | 92 | 83 | 291 |
| FS-7 | * | 15 | * | 14 | * | * | 18 |

*Could not identify samples
Composting Conditions:
FS-4 57–68° C., pH 8, wetness scale of 9.5–10
FS-6 21–32° C., pH 5–6, wetness scale of 10
FS-7 33–47° C., pH 4–7, wetness scale of 8–10

Figure 2:
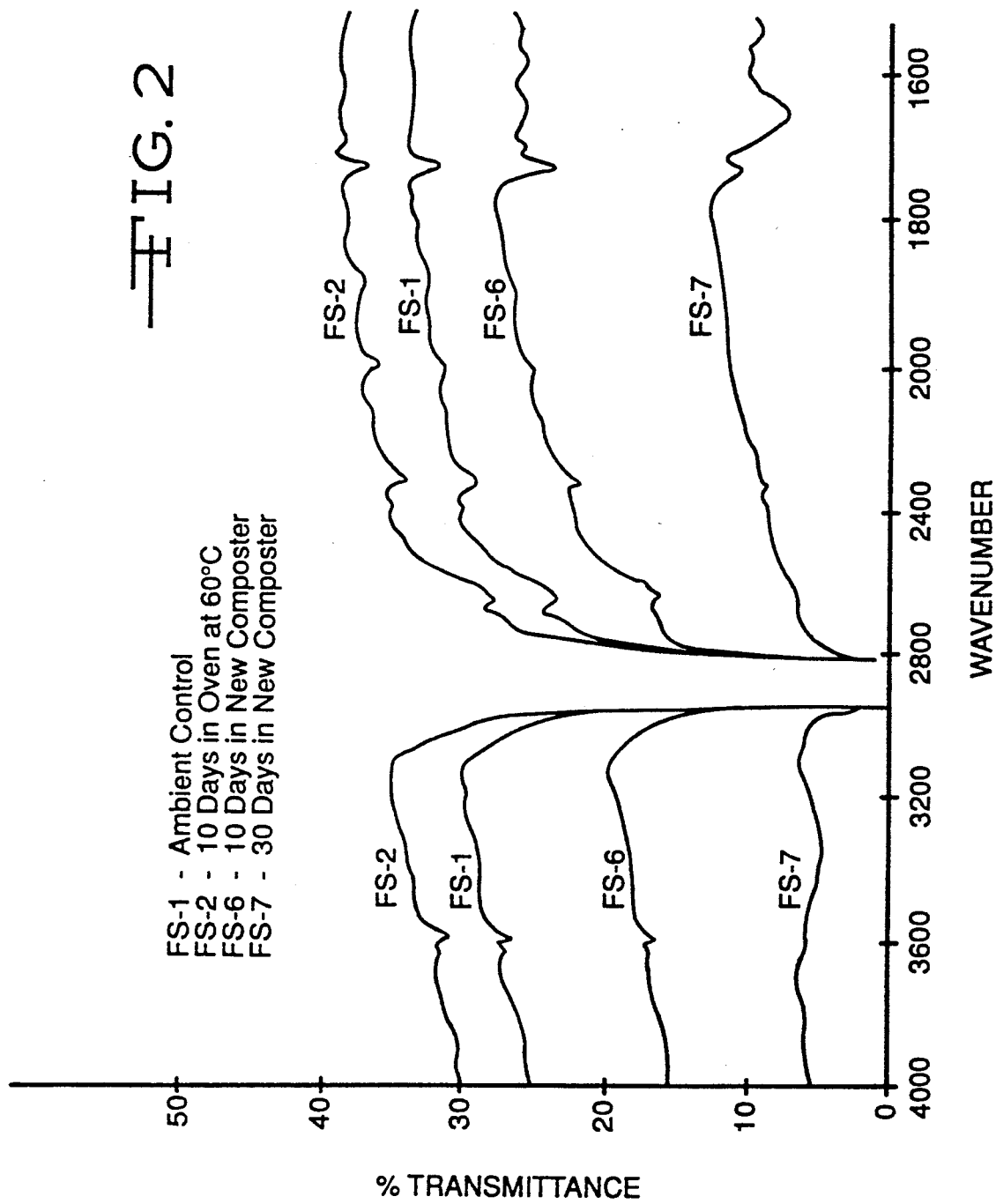
FIGS. 2 and 3 are infra-red (IR) spectrograms of a conventional non-compostable polyethylene-based diaper backsheet (FIG. 2) and a compostable film, (FIG. 3), before and after oven and composting tests.

The results shown in Table VIII indicate that the physical properties of these compostable and even the conventional PE film had significant decreases after composting in the new rotating composter. The new composter was rotated continuously and the film samples were broken-down by the mechanical actions. An adequate aeration was provided continuously by a small air compressor and by continuous turning. The composting temperature and the pH levels were lower in the new composter than in the old composter. The compostable film samples were thermally/oxidatively degraded in the new rotating composter. According to IR spectrograms shown in FIG. 2, the non-compostable conventional PE film samples have no change in chemical structure even though they have a large reduction in physical properties after composting. On the other hand, all the compostable film samples were broken-down by a chain scission process after 10-day or 30-day composting in the new composter. Strong peaks of some low molecular weight groups such as alcohols (at 3400 cm-1), aldehydes (at 1735 cm-1), carbonyl and ketones (at 1720 cm-1), and carboxylic acids (at 1710 cm-1) are presented in all of these thermally/oxidatively degraded film samples.

The results also indicate that an excess amount of the hydrolytically unstable antioxidant can be used in the compositions. The hydrolytically unstable antioxidant becomes ineffective under wet composting conditions especially under an acidic condition. The excess amount of such antioxidant can ensure the long-term shelf-life of the compostable films under dry conditions.

EXAMPLES 16-20

The blown-film samples in Examples 16 to 20 were prepared and tested the same way as the previous film samples. The compositions of these compostable film samples are listed in Table IX below. The compositions include unstabilized ECO (PM-1) and/or Tone ® Polymer (PM-3). The physical properties (tensile strength and elongation) and the molecular weight results of these compostable film samples are listed in Table X. The composting conditions were identical to that of the previous film samples (i.e., Examples 9 to 15).

TABLE IX

The Compostable Film Compositions
Weight, parts per 100 parts of Base Resin (phr)

| | EXAMPLES | | | | |
|---|---|---|---|---|---|
| | 16 | 17 | 18 | 19 | 20 |
| PP-1 | 100 | 100 | 100 | 100 | 100 |
| AO-1 | 0.6 | 0.6 | 0.6 | 0.6 | 0.6 |
| AO-2 | 0.2 | 0.2 | 0.2 | 0.2 | 0.2 |
| AO-3 | 0.2 | 0.2 | 0.2 | 0.2 | 0.2 |
| PO-1 | 10 | 10 | 10 | 10 | 10 |
| AC-1 | 4 | 4 | 4 | 4 | 4 |
| AC-3 | 1 | 1 | 1 | 1 | 1 |
| PM-1 | — | — | 10 | 10 | 10 |
| PM-3 | — | 5 | — | 5 | 10 |

TABLE X

Tensile Strength and Elongation of Film Samples

| | EXAMPLES | | | | |
|---|---|---|---|---|---|
| Samples | 16 | 17 | 18 | 19 | 20 |
| | MD Tensile Strength, grams | | | | |
| FS-1 | 3092 | 3171 | 2717 | 2530 | 3124 |
| FS-2 | 2438 | 2417 | 3175 | 2853 | 2375 |
| FS-3 | 2293 | 2485 | 2977 | 2463 | 2485 |
| FS-4 | 2347 | 2420 | 2642 | 2488 | 2942 |
| FS-6 | 1167 | 1145 | 1083 | 1185 | 1242 |
| FS-7 | 669 | 832 | 675 | * | * |
| | MD Elongation, % | | | | |
| FS-1 | 425 | 481 | 424 | 429 | 583 |
| FS-2 | 356 | 390 | 401 | 404 | 249 |
| FS-3 | 268 | 313 | 410 | 370 | 309 |
| FS-4 | 509 | 255 | 470 | 452 | 473 |
| FS-6 | 103 | 68 | 100 | 95 | 39 |
| FS-7 | 14 | 13 | 15 | * | * |
| | Wt. Average Molecular Wt., $M_w \times 1/1000$ | | | | |
| FS-1 | 191 | 185 | 165 | 172 | 207 |
| FS-2 | 182 | 153 | 153 | 192 | 199 |
| FS-3 | 216 | 213 | 188 | 204 | 205 |
| FS-4 | 220 | 205 | 189 | 189 | 216 |
| FS-6 | 11.6 | 13.0 | 12.3 | 15.0 | 12.2 |
| | Polydispersity ($M_w/M_n$) | | | | |
| FS-1 | 6.1 | 5.9 | 7.9 | 5.4 | 8.0 |
| FS-2 | 4.2 | 4.8 | 4.8 | 5.8 | 8.1 |
| FS-3 | 6.1 | 6.4 | 6.4 | 6.6 | 7.6 |
| FS-4 | 5.3 | 5.6 | 5.7 | 6.5 | 6.9 |
| FS-6 | 3.6 | 3.0 | 3.0 | 3.1 | 3.6 |

*Could not identify samples
Composting conditions: same as in Examples 9-15

The results indicate that the tensile strength and elongation decrease significantly after 10-day or 30-day composting in the new rotating composter. After 10-day composting, the weight-average molecular weights decrease about 91 to 94% and the number-average molecular weights decrease about 80 to 90% from the ambient control samples. The polydispersity becomes smaller. The unstabilized EPCP resin broke down quickly to low molecular materials and with a narrow molecular weight distribution.

Figure 3:
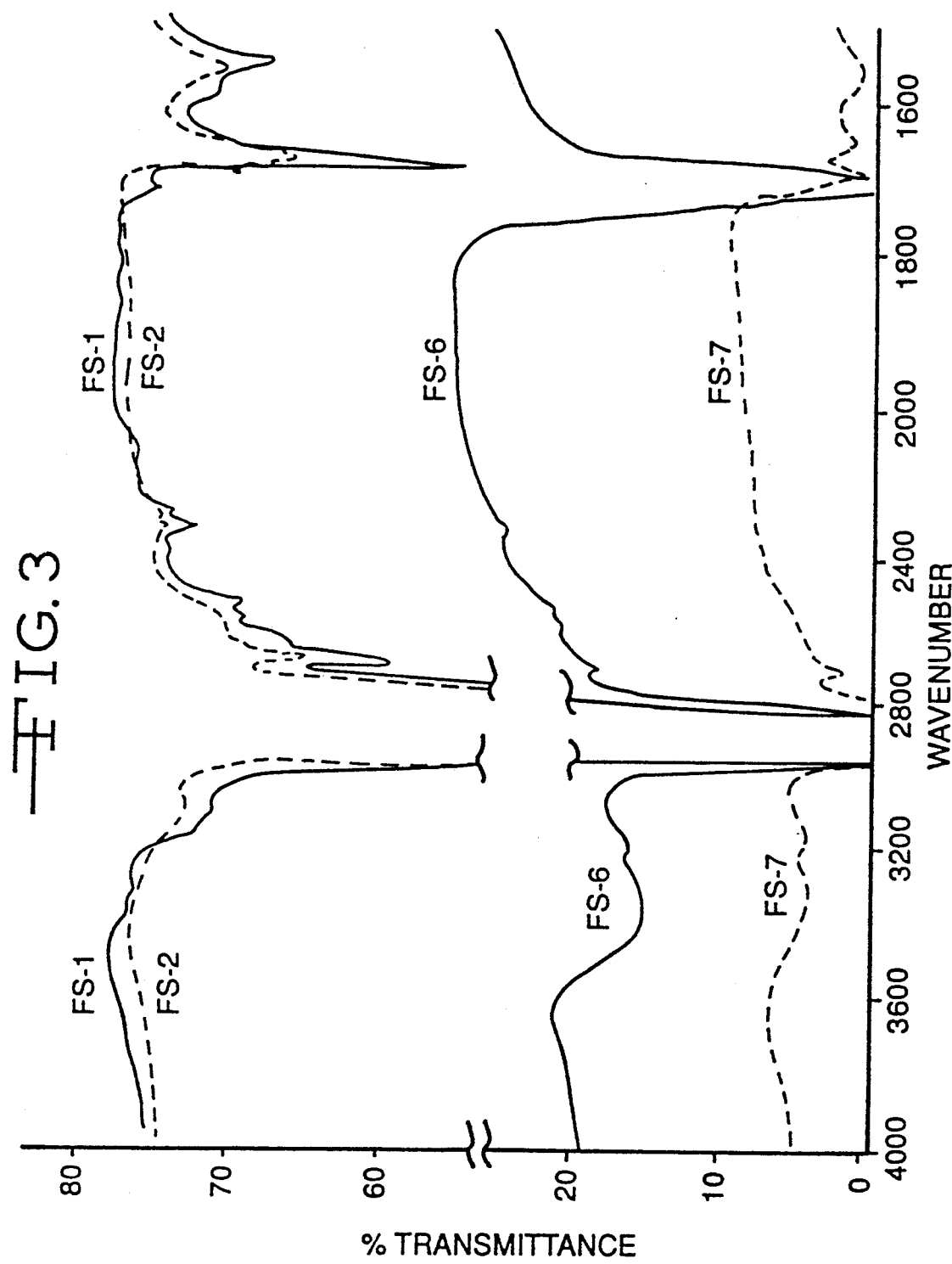

According to IR spectrograms shown in FIG. 3, the film samples tested in dry oven, wet oven, and 10-day in old composter (i.e., FS-2, FS-3, and FS-4) have no significant change in chemical structure as compared to the ambient control film samples (FS-1). Strong peaks of some low molecular weight materials such as alcohols, aldehydes, carbonyl, ketones, and carboxylic acids are presented in all of the 10-day and 30-day composting samples tested in the new rotating composter (i.e., FS-6 and FS-7). Under the same oven and composting tests, the conventional PE film samples in Example 15 have no change in chemical structure.

The results indicate that in a composting process two major factors in the decomposition of the compostable films of the present invention are oxidation (adequate aeration) and acidic conditions (low pH). The hydrolytically unstable antioxidants become ineffective under acidic conditions and the unstabilized thermoplastic resins can then thermally and oxidatively degrade to low molecular weight materials by a chain scission process.

EXAMPLES 21–29

The blown-film samples in Examples 21 to 29 were prepared and tested the same way as the previous film samples. The compositions of these compostable film samples are listed in Table XI below. The compositions include stabilized Exxelor ® PA 20-2 as property modifier. The physical properties (tensile strength and elongation) of these compostable film samples and a conventional non-compostable, polyethylene-base diaper backsheet (Example 29) are listed in Table XII below.

These compostable film samples (Examples 21 to 29) contain very low levels of antioxidant and pro-oxidant. The antioxidants used in several examples include Vitamin E (Rontex ® 201) and Vitamin C (Rontex ® 100) or oil-soluble Vitamin C (Ascorbyl palmitate). The results shown in Table XII indicate that these film samples were very stable in dry oven but they degraded slightly after composting. The conventional polyethylene-base diaper backsheet had no reduction in physical properties after composting. Vitamins E and C are very useful as hydrolytically unstable antioxidants. The results also indicate that in certain embodiments, higher amounts of antioxidant and pro-oxidant may be required in order to break down the compostable film samples quickly during the composting process.

TABLE XI

Compostable Film Compositions
Weight, parts per 100 parts of Base Resin (phr)

| | Examples | | | | | | | |
|---|---|---|---|---|---|---|---|---|
| | 21 | 22 | 23 | 24 | 25 | 26 | 27 | 28 |
| PP-2 | 100 | 100 | 100 | 100 | 100 | 100 | 100 | 100 |
| AO-1 | — | — | 0.03 | 0.03 | 0.03 | — | — | 0.3 |
| AO-2 | — | — | 0.01 | 0.01 | 0.01 | — | — | 0.1 |
| AO-3 | 0.05 | 0.05 | — | — | — | 0.5 | 0.5 | — |
| AO-4 | 0.15 | — | — | — | — | — | 1.5 | — |
| AO-5 | — | 0.15 | — | — | — | 1.5 | — | — |
| PO-1 | 0.25 | 0.25 | 0.25 | 0.25 | 0.25 | 2.5 | 2.5 | 2.5 |
| AC-1 | 0.1 | 0.1 | 0.1 | — | — | — | — | — |

TABLE XI-continued

Compostable Film Compositions
Weight, parts per 100 parts of Base Resin (phr)

| | Examples | | | | | | | |
|---|---|---|---|---|---|---|---|---|
| | 21 | 22 | 23 | 24 | 25 | 26 | 27 | 28 |
| AC-3 | — | — | — | 0.1 | — | — | — | — |
| AC-4 | — | — | — | — | 0.1 | — | — | — |
| AC-5 | — | — | — | — | — | 0.5 | 0.5 | 0.5 |
| PM-4 | 2.5 | 2.5 | 2.5 | 2.5 | 2.5 | 10 | 10 | 10 |

TABLE XII

Tensile Strength and Elongation of Film Samples

| | Examples | | | | | | | | 29 |
|---|---|---|---|---|---|---|---|---|---|
| Samples | 21 | 22 | 23 | 24 | 25 | 26 | 27 | 28 | PE Film |
| MD Tensile Strength, grams | | | | | | | | | |
| FS-1 | 4497 | 4956 | 4614 | 5008 | 5269 | 5395 | 4456 | 5043 | 2440 |
| FS-2 | 4962 | 4537 | 4881 | 4964 | 5262 | 4362 | 4832 | 5869 | 2451 |
| FS-3 | 4650 | 5181 | 5116 | 5486 | 5893 | 5225 | 5405 | 5227 | — |
| FS-4 | 4293 | 4249 | 2702 | 4664 | 4193 | 3933 | 4442 | 4548 | 2429 |
| MD Elongation, % | | | | | | | | | |
| FS-1 | 354 | 384 | 372 | 395 | 408 | 418 | 372 | 416 | 374 |
| FS-2 | 341 | 349 | 389 | 384 | 415 | 327 | 341 | 419 | 338 |
| FS-3 | 377 | 363 | 401 | 395 | 442 | 401 | 409 | 394 | — |
| FS-4 | 288 | 272 | 224 | 348 | 302 | 294 | 333 | 322 | 341 |

Composting temperatures: Composter 49–57° C., Ambient 22–28° C.

EXAMPLE 30

A film sample was made of an unstabilized EPCP resin (PP-1) containing 50 ppm of a pro-oxidant additive (i.e. manganese stearate). The extrusion heat and the presence of the pro-oxidant cause this film to become fragments quickly in less than three months at ambient temperature. The GPC results indicate that the weight-average molecular weight decreases about 95%, the number-average molecular weight decreases about 70%, and polydispersity decreases about 47% from the original resin sample. After 15 months room temperature aging, the weight-average molecular weight decreases further to about 3,800 (98% reduction in $\overline{M}w$) and the polydispersity drops 70% from the original resin sample. The number-average molecular weight decreases slightly from about 2,600 to 2,200 after the continuous aging for another year. The molecular weight results of this unstabilized EPCP film are listed in Table XIII.

The results indicate that the pro-oxidant can cause the unstabilized EPCP resin to break-down quickly by a chain scission process. The chain scission process is a continuous process. After 15-month room temperature aging, the weight-average and number-average molecular weights of an unstabilized EPCP resin decreases to about 3,800 and 2,200, respectively. The weight-average and number-average molecular weights decreases below 1,000 or 500 after a longer time period. Therefore, the unstabilized EPCP resin is very compostable but it has no long-term shelf-life. The hydrolytically unstable antioxidants and biological antioxidants described in the present invention can provide and ensure the long-term shelf-life of the compostable films under dry conditions.

TABLE XIII

Molecular Weights of Unstabilized EPCP Film

| | Average Molecular Weights | | | Polydispersity |
|---|---|---|---|---|
| | $\overline{M_w}$ | $\overline{M_n}$ | $\overline{M_z}$ | $\overline{M_w}/\overline{M_n}$ |
| Original Resin Sample | 168,000 | 29,000 | 514,000 | 5.8 |
| Film Fragments 3 months After Film Extrusion | 8,000 | 2,600 | 154,000 | 3.1 |
| Film Fragments 15 months After Film Extrusion | 3,800 | 2,200 | 6,000 | 1.7 |

Resin sample: unstabilized EPCP (PP-1)
Film sample: unstabilized EPCP plus 50 ppm manganese stearate
Film fragments: Obtained after room temperature aging From the description contained herein, it is clear that the compostable composition of the present invention provides a unique combination of characteristics previously unobtainable in a disposable article, i.e., long-term shelf-life under dry conditions, and rapid biodegradation under wet, composting conditions, particularly when exposed to thermally and oxidatively degrading environments and in the presence of microorganisms.

While the present invention has been described primarily in the context of films, it is recognized that the present invention may also be practiced to advantage in many other applications and environments. It will be obvious to those skilled in the art that various changes and modifications can be made without departing from the spirit and scope of the invention, and it is intended to cover in the appended claims, all such modifications that are within the scope of this invention.

We claim:

1. A composition for preparing compostable articles comprising a non-starch based, degradable blend of:
   at least one unstabilized thermoplastic polymer, wherein the unstabilized thermoplastic polymer is essentially free of antioxidants, and wherein the unstabilized thermoplastic polymer comprises at least one homopolymer, copolymer or terpolymer of polypropylene, and optionally, copolymers of ethylene-carbonmonoxide, copolymers of ethylene-vinyl ketone, or mixtures thereof;
   at least one hydrolytically unstable phosphorus or biological anti-oxidant which becomes ineffective under hydrolytic conditions to cause the unstabilized thermoplastic polymer to oxidatively and thermally degrade;
   at least one pro-oxidant;
   at least one accelerator; and,
   at least one property modifier.

2. The composition of claim 1, wherein the unstabilized polymer comprises a blend of polypropylene and at least one other comonomer.

3. The composition of claim 1, wherein the comonomer comprises ethylene, butene, hexene and mixtures thereof.

4. The composition of claim 1, wherein the comonomer comprises about 3–20%, by wt., of the thermoplastic polymer, based on the weight of the thermoplastic polymer.

5. The composition of claim 1, wherein the hydrolytically unstable antioxidant comprises a chain-terminating and/or hydroperoxide decomposing antioxidant which becomes ineffective under hydrolytic conditions by reacting with free radicals present in the compostable composition to cause the thermoplastic polymer to oxidatively and thermally degrade.

6. The composition of claim 1, wherein the hydrolytically unstable antioxidant comprises at least one phosphite or phosphonite compound.

7. The composition of claim 1, wherein the hydrolytically unstable antioxidant comprises a biological antioxidant selected from the group consisting of water soluble Vitamin C, oil soluble Vitamin C, a blend of Vitamin C and Vitamin E, a blend of Vitamin C and mixtures thereof.

8. The composition of claim 1, further comprising at least one phenolic or aromatic antioxidant wherein the amount of phenolic antioxidant is in the range of about 0.02 to about 0.03%, by wt., based on the weight of the thermoplastic polymer and the amount of the hydrolytically unstable antioxidant is in the range of about 2:1 to about 5:1 weight ratio of hydrolytically unstable antioxidant-to-phenolic antioxidant.

9. The composition of claim 1, wherein the pro-oxidant comprises at least one transition metal salt or complex.

10. The composition of claim 9, wherein the pro-oxidant is present in the amount of about 0.01 to about 1.0%, by wt., based on the weight of the thermoplastic polymer.

11. The composition of claim 9, wherein the pro-oxidant comprises at least one transition metal salt or complex of a stearate, oleate, linoleate, palmitate, erucate, behemate, myristate, napthenate, acetonyl, acetonate, hydroquinolinate, metalamine salt complex or mixtures thereof.

12. The composition of claim 11, wherein the transition metal comprises manganese, cerium or iron.

13. The composition of claim 1, wherein the accelerator comprises at least one hydrophilic polymer, biodegradable or hydrolyzable thermoplastic polymer, organotin compound, transition metal salt or complex, low molecular weight organic compound, or mixtures thereof.

14. The composition of claim 13, wherein the accelerator comprises at least one organic photodegradable additive, unsaturated liquid elastomer, unstabilized thermoplastic elastomer, biodegradable polymer, water soluble polymers and mixtures thereof.

15. The composition of claim 1, wherein the accelerator is present in the amount of about 0.05 to about 5.0%, by wt., based on the weight of the thermoplastic polymer.

16. The composition of claim 1, wherein the property modifier comprises at least one substantially water-insoluble hydrophobic thermoplastic polymer or copolymer, biodegradable or hydrolyzable thermoplastic polymer and mixtures thereof.

17. The composition of claim 1, wherein the property modifier is present in the amount of about 1 to about 50%, by wt., based on the weight of the thermoplastic polymer.

18. The composition of claim 1, wherein the composition further includes optional components selected from the group consisting of heat stabilizers, flame retardants, pigments, antiblocking agents, antistatic agents, inorganic fillers, lubricants, plasticizers, or mixtures thereof.

19. A compostable article prepared from the composition of claim 1.

20. The compostable article of claim 19 which is a thin sheet or film.

21. The compostable article of claim 19 which is a multilayer film having a core layer comprised of a hydrolytically unstable biodegradable polymer and two outer layers comprised of the composition of claim 1.

22. The compostable article of claim 20 which is an embossed film.

23. The compostable article of claim 20 which is a uniaxially or biaxially oriented film.

24. The composition of claim 2 wherein the copolymer or terpolymer of polypropylene comprises a comonomer content of about 3.0% to about 20%, by weight.

* * * * *